United States Patent [19]
Tribble et al.

[11] Patent Number: 5,960,087
[45] Date of Patent: Sep. 28, 1999

[54] DISTRIBUTED GARBAGE COLLECTION SYSTEM AND METHOD

[75] Inventors: E. Dean Tribble, Los Altos Hills; Mark S. Miller, Los Altos; Norman Hardy, Portola Valley; Jacob Y. Levy, Los Altos; Eric C. Hill, Palo Alto; Christopher T. Hibbert, Mountain View, all of Calif.

[73] Assignee: Sun Microsystems, Inc., Mountain View, Calif.

[21] Appl. No.: 08/674,114

[22] Filed: Jul. 1, 1996

[51] Int. Cl.$^6$ ............... H04L 9/00; H04L 9/30; G06F 17/30

[52] U.S. Cl. ............. 380/49; 380/9; 380/30; 380/59; 395/186; 395/187.01; 707/200; 707/205; 707/206

[58] Field of Search ............ 380/9, 21, 28, 380/30, 49, 50, 59; 707/103, 200, 205, 206, 10, 100, 203; 395/186, 187.01, 188.01

[56] References Cited

U.S. PATENT DOCUMENTS

| | | | |
|---|---|---|---|
| 4,755,939 | 7/1988 | Watson | 707/206 |
| 5,241,673 | 8/1993 | Schelvis | 707/103 |
| 5,819,299 | 10/1998 | Bejar | 707/206 |

OTHER PUBLICATIONS

Codie Wells: A Note on "Protection Imperfect" (1988) 2 pages.

Marc Shapiro, et. al.: Some Key Issues in the Design of Distributed Garbage Collection and References (Apr. 15, 1994) pp. 1–13.

M. Anderson, et al.: A Password–Capability System (1986) The Computer Journal, vol. 29, No. 1.

Andrew Birrell, et al.: Network Objects (SRC Research Reports #115) (Feb. 28, 1994) pp. 1–65.

Andrew Birrell, et al.: Distibuted Garbage Collection for Network Objects (SRC Research Report #116) pp. 1–18.

Norm Hardy, The Confused Deputy (1985) 2 pages.

A.S. Tanenbaum, et al.: Using Sparse Capability in a Distributed Operating System (1986) Proc. Sixth Int'l Conf. On Distributed Computing Systems, IEEE, pp. 558–563.

Robert D. Sansom, et al.: Extending a Capability Based System into a Network Environment (1986) Research sponsored by DOD, pp. 265–274.

List of Ameoba Papers, 3 pages.

Robert van Renesse, et al.: Wide–Area Communication Under Amoeba (Dec. 1986) IR–117, Vrije Universiteit, pp. 114–126.

(List continued on next page.)

*Primary Examiner*—Bernarr E. Gregory
*Attorney, Agent, or Firm*—Steven F. Caserza; Flehr Hohbach Test Albritton & Herbert LLP

[57] ABSTRACT

A distributed garbage collection system and method is disclosed that is compatible with local ref-count or full garbage collection and that ensures that no local object's storage is deleted by the local garbage collector unless it is certain that there are no actual or potential remote references to that local object. The disclosed system and method are implemented in the context of a transparent distributed object system in which communications between objects in different processes are enabled by dedicated proxy objects that are linked to corresponding remote objects via a pair of transport objects. Additional proxy holder objects and proxy holder proxies ensure that objects for which third-party object references are passed (i.e., where one object in a first process passes a remote object in a second process a reference to a third object in a third process) are not collected until a direct link is established between the remote object in the second process and the third object in the third object space. As appropriate, secret number table pointers maintained by a local registrar for each object that has been accessed via a third party message are deleted, allowing the objects to be collected when there are no other actual or pending remote references to that object. The transport managers encrypt all inter-process messages so as to provide full capability security within the distributed system. This enables the disclosed garbage collection system and methods to operate under attack from misbehaving participants.

20 Claims, 19 Drawing Sheets

OTHER PUBLICATIONS

Robert van Renesse, et al.: Connecting RPC–Based Distributed Systems Using Wide–Area Networks (1987) Proc. Seventh Int'l Conf. on Distr. Comp. Systems, IEEE, pp. 28–34.

Robert van Renesse, et al.: The Performance of the Amoeba Distributed Operating System (Mar. 1989) Software—Practice and Experience, vol. 19, pp. 223–234.

M. Frans Kaashoek, et al.: Transparent Fault–Tolerance in Parallel ORCA Programs (Mar. 1992) Symposium on Experiences with Distributed and Multiprocessor Systems III, Newport Beach, pp. 297–312.

Robert van Renesse, et al.: Voting with Ghosts (1988) Proc. Eighth Int'l. Conf. on Distr. Computer Systems, IEEE, pp. 456–461.

Henri E. Bal: A Comparative Study of Five Parallel Programming Languages (1991) EurOpen Spring 1991 Conference on Open Distributed Systems, Tromso, pp. 209–228.

Henri E. Bal: Replication Techniques for Speeding up Parallel Applications on Distributed Systems (Oct. 1989) IR–202, Vrije Universiteit, pp. 1–19.

Tanenbaum, et al.: An Introduction to Amoeba, Vrije Universiteit, pp. 2–7.

S.J. Mullender, et al.: Amoeba—A Distributed Operating System for the 1990s (May 1990) Computer, Published by IEEE Computer Society, pp. 44–53.

F. Douglis, et al.: A Comparison of two Distributed Systems: Amoeba and Sprite (Dec. 1991) Computing Systems, vol. 4, No. 3, pp. 353–384.

Henri E. Bal, et al.: Distributed Programming with Shared Data (1988) IEEE Conf. on Computer Languages, IEEE, pp. 82–91.

Henri E. Bal, et al.: ORCA: A Language for Distributed Programming (Dec. 1987) IR–140, Vrije Universiteit, pp. 192–199.

G. van Rossum: AIL—A Class–Oriented RPC Stub Generator for Amoeba (1989) Proc. of the Workshop on Experience with Distr. Systems, Springer Verlag, pp. 82–90.

S.J. Mullander: Distributed Operating Systems: State–of–t-he–Art and Future Directions (1988) Proc. of the EUTECO 88 Conf., Vienna, Austria, pp. 53–60.

R. van Renesse, et al.: The Design of a High–Performance File Server (1989) Proc. Ninth Int'l Conf. on Distr. Comp. Systems, IEEE, pp. 22–27.

E.H. Baalbergen: Design and Implementation of Parallel Make (Spring 1988) Computing Systems, vol. 1, pp. 135–158.

A.S. Tanenbaum: The Amoeba Distributed Operating System (1993) Vrije Universiteit, 12 pages.

M.F. Kaashoek, et al.: An Efficient Reliable Broadcast Protocol (Oct. 1989) Operating Systems Review, vol. 23, pp. 5–19.

M.F. Kaashoek, et al.: Efficient Reliable Group Communication for Distributed Systems (Jun. 1992) IR–295, Vrije Universiteit, Amsterdam, pp. 1–51.

Overview of Amoeba, pp. 2–13.

C.R. Landau: Security in a Secure Capability–Based System (Oct. 1989) Operating Systems Review, 3 pages.

Sun Microsystems Laboratories, Inc.; SunConnect, Inc., Agorics, Inc.: Real–Time Video Delivery with Market–Based Resource Allocation, pp. 1–25.

Agorics Technical Report ADd004.4P: Joule: Distributed Application Foundations (Nov. 1994) pp. 1–93.

Netscape Communications Corporation: SSL v3.0: N Standards Documentation (1995), pp.

B.W. Lampson: A Note on the Confinement Problem (1973) ACM, vol. 16, No. 10, 5 pages.

A.S. Tanenbaum: Distributed Operating Systems (1995) Vrije Universiteit, Amsterdam, The Netherlands, (1995) Prentice Hall.

D. Hellman: Weak Table References, five vague descriptions.

Miller, et al.: Markets and Computation: Agoric Open Systems (1988) The Ecology of Computation, pp. 1–44.

USA–Japan Computer Conference Proceedings: Table of Contents (Oct. 1978).

Strom, et al.: Optimistic Recovery: An Asynchronous Approach to Fault–Tolerance in Distributed Systems ( Proc. FTCS–14, Jun. 1984) IEEE, pp. 374–379.

Kahn, et al.: Money as a Concurrent Logic Program (1988) pp. 1–23.

S.E. Abdullahi, et al.: Collection Schemes for Distributed Garbage, (Sep. 1992) Int'l. Workshop on Memory Management (IWMM) 92, Springer Verlag, pp. 43–81.

P.B. Bishop: Computers with a Large Address Space and Garbage Collection (May 1977) MIT Lab. For Computer Science (LCS) Technical Rpt. 178, MIT, Cambridge, MA.

W.D. Clinger: Foundations of Actor Semantics (May 1981) MIT, Cambridge, MA.

J.E. Donnelley: Managing Domains in a Network Operating System (1981) Proceedings of the Conference on Local Networks and Distributed Office Systems, Online, pp. 345–361.

C.N.R. Dellar: Removing Backing Store Administration from the Cap Operating System (1980) Operating System Review, vol. 14, No. 4, pp. 41–49.

A. Elhabash, et al.: Garbage Collection in an Object Oriented, Distributed, Persistent Environment (1990) ECOOP/OOPSLA '90 Workshop on Garbage Collection.

Hardy U.S. Patent No. 4,584,639 dated Apr. 22, 1986: Computer Security System.

P. Ferreira, et al.: Larchant: Persistence by Reachability in Distributed Shared Memory Through Garbage Collection (May 1996) 16th Intl. Confer. On Distributed Computer Systems (ICDCS) Hong Kong, pp. 1–8.

N. Hardy: KeyKOS Architecture (Sep. 1985) Operating System Review, pp. 1–23.

K. Kahn, et al.: Language Design and Open Systems, The Ecology of Computation (1981), pp. 1–25.

E. Kolodner: Atomic Incremental Garbage Collection and Recovery for Large Stable Heaps Implementing Persistent Object Bases: Principles and Practice, 4th Intl. Workshop on Persistent Object Systems, Morgan Kaufman, San Mateo, CA (1991).

H. Levy: Capability– and Object–Based System Concepts, Digital Press (1984) pp. 1–18.

M.S. Miller, et al.: Logical Secrets, Concurrent Prolog: Collected Papers, vol. 2, MIT Press (1987) pp. 140–161.

J.E.B. Moss: Garbage Collecting persistent Object Stores, ECOOP/OOPSLA '90 Workshop on Garbage Collection (Oct. 1990) pp. 1–5.

S.J. Mullender: Accounting and Resource Control, Distributed Systems, edited by S.J. Mullender, ACM (1989) pp. 133–145.

D. Plainfosse, et al.: A Survey of Distributed Garbage Collection Techniques, Proceedings of the Intl. Workshop on Memory Management, Kinross, Scotland (Sep. 1995) pp. 211–249.

B. Schneier: Applied Cryptography, Protocols, Algorithms, and Source Code in C.

P.R. Wilson: Uniprocessor Garbage Collection Techniques, Intl. Workshop on Memory Mgmt. (IWMM) 92, Springer Verlag (Sep. 1992) pp. 1–42.

R.P. Draves, et al.: Using Continuations to Implement Thread Management and Communication in Operating Systems, School of Computer Science, Carnegie Mellon University, Pittsburgh, PA, 15 pages.

R.W. Dean: Using Continuations to Build a User–Level Threads Library, School of Computer Science, Carnegie Mellon University, Pittsburgh, PA, 17 pages.

J.S. Barrera, III: A Fast Mach Network IPC Implementation, School of Computer Science, Carnegie Mellon University, Pittsburgh, PA, 11 pages.

R. Draves: A Revised IPC Interface, (1991) pp. 1–14.

W.S. Frantz, et al.: Object Oriented Transaction Processing in the KeyKOS Microkernel (Sep. 1993) pp. 1–16.

R. Rashid, et al.: Mach: A Foundation for Open Systems, School of Computer Science, Carnegie Mellon University, Pittsburgh, PA, 6 pages.

D.V. Duong: Project Report: Trader Network Lrng 792: Computational Modeling of Social Learning (1995) pp. 1–6.

J.E.B. Moss, et al.: PMOS: A Complete and Coarse–Grained Incremental Garbage Collector for Persistent Object Stores, ECOOP/OOPSLA '90 Workshop on Garbage Collection (1990) pp. 1–13.

P. Bogle, et al.: Reducing Cross Domain Call Overhead Using Batched Futures, OOPSLA 9th Annual Conference (Oct. 23–27, 1994) pp. 341–354.

D. Tribble, et al.: Channels: A Generalization of Streams, Collected Papers, pp. 447–463.

J.S. Auerbach, et al.: High–Level Language Support for Programming Distributed Systems, 1992 Intl. Conference on Computer Languages (Apr. 20–23, 1992), pp. 320–330.

ParcPlace VisualWorks: Chapter 18: Weak Arrays and Finalization, pp. 311–318.

M. Schelvis: Incremental Distribution of Timestamp Packets: A New Approach to Distributed Garbage Collection, Object–Oriented Programming: Systems, Languages and Application, OOPSLA Conference Proceedings, vol. 24, No. 10 (Oct. 1–6, 1989) pp. 37–48.

R.F. Rashid: From Rig to Accent to Mach: The Evolution of a Network Operating System, Studies in Computer Science and Artificial Intelligence (1988) The Ecology of Computation, North Holland, pp. 207–229.

D.F. Ferguson: The Application of Microeconomics to the Design of Resource Allocation and Control Algorithms, pp. 1–156.

Object Management Group: The Common Object Request Broker: Architecture and Specification (Jul. 1995) sections 1–21.

William A. Wulf, et al.: HYDRA/C.mmp—An Experimental Computer System (1981) pp. 1–282, McGraw Hill, NY.

DISTRIBUTED GARBAGE COLLECTION SYSTEM AND METHOD

The present invention relates generally to garbage collection and, particularly, to systems and methods for providing garbage collection for distributed object-systems.

BACKGROUND OF THE INVENTION

It is well known how to construct distributed, object-oriented applications, components of which (i.e., the application's constituent objects), execute on different machines and communicate (i.e., exchange messages) across the machine boundaries. One such system is shown in FIG. 1, consisting of two machines M1, M2 and four processes A, B, C, D. Each process runs in a different address space in its respective host machine and includes one or more objects which perform the tasks associated with the process. For example, the process A includes three objects A1, A2, A3.

In a distributed object system, inter-object communications can be represented in the form: destination.message_name( ). For example, a programmer can specify that the object C1 issue a message to the object A1 using the syntax: "A/A1.foo( )", where "foo( )" denotes the message ("foo" being the message name and "( )" the arguments) and "A/A1" is the message destination (object A1 in process A). Note that in a typical distributed object system the programmer would not actually need to write the destination as "A/A1"; however, for the purposes of the present application this syntax is used to highlight the process and object to which a message is being sent.

Most distributed object systems have evolved to allow transparent message passing. Allowing distributed objects to communicate in a transparent fashion means that a distributed object system must support intra-process, inter-process and inter-machine communications between objects in a way that is transparent to the user, programmer or objects. I.e., transparency means that an object need not be strictly aware of other objects' locations when issuing messages. For example, if the distributed object system of FIG. 1 supported transparent messaging, the objects C1 and A2 could issue the message "foo( )" to the object A1 using the same syntax: A1 .foo( ).

However, even in transparent distributed object systems, there are significant implementation differences between intra-process, inter-process and inter-machine communications that must be addressed. Intra-process communications are faster and more reliable then the other types of communications, consisting of the simple passing of local pointers. Inter-process messaging is also fast, since it occurs within a machine, but additionally requires that object addresses be translated between different processes. Inter-machine communications are much slower and less reliable than the other two types of messaging due to latency associated with issuing messages across an external communications channel and the relatively greater likelihood of channel failure. All of these issues are dealt with in one way or another by the prior art.

Object security is a significant issue raised by distributed object systems. Security problems arise due to the potential lack of trustworthiness of objects, processes and machines. For example, referring to FIG. 1, assume that the objects A1 and A2 are, respectively, a very powerful object and a misbehaving object. If A2 were somehow given access to the full power (i.e., methods) of A1, then A2 could disrupt process A using the full power of A1's methods. Similar security problems can arise between processes (e.g., when access to a process is given to an object in an untrustworthy process) or between machines (e.g., where a misbehaving machine issues unauthorized messages to an object running on another machine). Many distributed object systems have not attempted to deal with these security issues; other systems have provided incomplete solutions that deal with only a subset of the above-mentioned object, process and machine trust issues. However, the prior art includes one technique, called capability security, that addresses most of these problems, albeit only locally (i.e., within a process). Thus, there is a need to extend the ideas of capability security to distributed systems.

The basic tenet of capability security is that the right to do something to an object (i.e., invoke a particular object's methods) is represented solely by the holding of a reference to the particular object. To prevent the unauthorized exercise of rights by misbehaving objects, capability security only allows an object to acquire the capability (i.e., object reference) to access a particular object in one of the following ways:

(1) by receiving the capability from an object that already holds that right (through a message or during creation); and (2) by being the object that created the particular object.

Thus, referring again to FIG. 1, in an object system that implements capability security, the object A1 could not pass to the object A3 a reference to the object D1 as A1 does not have that capability (in FIG. 1, a directed arrow represents the right to access the object at the end of the arrow).

Traditionally, capability security has been implemented using front end objects, as shown in FIG. 2. In this figure, the object A1 is a very powerful object whose respective methods (not shown) are accessed through the messages msg1, msg2, and msg3. The objects A2, A3 and A4 are less powerful front-end objects that only respond to a subset of the messages supported by A1. For example, the object A2 only responds to msg1. This means that, even though the object A2 can access the object A1, it only exercises the limited set of A1's powers corresponding to msg1. Therefore, by exporting references to different subsets of the front end objects, different capability subsets with respect to the object A1 can be created. For example, referring to FIG. 2, the Requestor only has the capability (an object has a capability if it (1) has a right of access and (2) knows the ID/location of the object for which it possesses the right) to access the object A2, which means that it can only invoke the methods of the object A1 that are triggered by msg1. The Requestor could, by receiving a reference to the object A3, also acquire the additional capability to cause msg2 to be issued to the object A1. Of course, the presence of a capability security system ensures that rights can only be passed by authorized objects.

The traditional formulation of capability security does not make explicit all of the security problems that can arise in distributed object systems. Because capability security was not designed with distributed systems in mind its inventors did not include in their formulation techniques for solving the problems of distributed systems that are due to possibly misbehaving processes and remote objects and insecure communications channels. The traditional definition of capability security does not explicitly forbid an imposter from interfering with the normal process of message reception and/or decoding so as to stand in for one of the capabilities transmitted. For example, referring again to FIG. 1, if the object C1 passed a reference for the object B1 to the object A1, but the object D1 interfered with the reception and/or decoding of the message by A1, A1 might then come to hold a capability to D1, thinking that it got this capability from C1. A1 might then send messages to D1 that it intended to send only to the object referred to it by C1. Therefore, there is a need for an extended definition of capability security for distributed object systems to indicate that the capabilities that a recipient receives correspond exactly to those that the sender sent.

Another possible problem arising in a distributed object system that can exist under the traditional definition of capability security is what we shall call "confusing the deputy". Referring again to FIG. 1, this is the situation where a first object (e.g., C1) that does not hold a reference to a second object (e.g, A3) tries to pass a message to a third object to which it does have access (e.g, A1), where the third object itself has access to the second object (A3), that would fool the third object A1 into believing that the first object (C1) does have access to the third object. By doing this, there is a possibility that the first object (C1) could induce the third object A1 to issue messages to the second object which the first object C1 itself could not issue. Therefore, there is a need for an extended definition of capability security adaptable to distributed object systems that prevents the problem of confusing the deputy (in the preceding example, A1 is the deputy).

The above two problems point out loopholes in the traditional definition of capability security. Most implemented non-distributed capability systems do not have these loopholes. However, these loopholes are more likely to be present in implementations of distributed capability systems, which is why there is a need for a revised formulation of capability security when engineering distributed capability systems.

Some object systems provide a "garbage collection" system that automatically reclaims unused object storage within a single process. These garbage collectors periodically determine which object storage in their process is garbage (no longer in use) and then collects (reclaims) the unused storage to the heap.

"Full" garbage collection treats as garbage any object (meaning object storage) that is not strongly reachable from the "roots" of garbage collection, which commonly include global variables and the stack in any thread that happens to be executing. What is meant by strongly reachable is that the particular object can be reached from a root of garbage collection using a chain of strong pointers (indicative of actual use) rather than a weak pointer (indicative of a mere reference to the object weakly pointed to). Note that many systems only use strong pointers. Thus, if an object A is strongly reachable from some root R1, and an object B is strongly reachable from the object A, neither A nor B would be collected by full garbage collection. In contrast, if A were only reachable through a chain including weak pointers from any root, both A and B would be collected.

Ref-count garbage collection treats as garbage any object that is not strongly reachable from any other object. A ref-count garbage collector maintains a ref-count (short for reference count) that represents the number of strong references to each object in its process. These ref-count collectors increment and decrement the counts as references to each object are added and dropped. After updating its ref-counts, the ref-count garbage collector reclaims the storage of all objects which have zero ref-counts. Thus, in both of the above scenarios, neither A nor B would be collected. Note that ref-count garbage collection does not collect cyclical garbage. An advantage of ref-count GC is that it is incremental in nature, meaning that it can run while the local process continues to execute.

Distributed garbage collection is complicated by references that are in transit, or "in the air" (i.e., references in the process of being passed between objects in different ones of the processes that compose the distributed object system). Unless it accounts for all references that are in transit, a distributed garbage collector is likely to erroneously collect objects that are referenced or about to be referenced by objects in different processes. Therefore, there is a need for a distributed garbage collector that accounts for references that are in transit.

A problem with prior art distributed garbage collectors is that they are susceptible to attack by misbehaving participants (i.e., non-cooperating processes that are participating in the distributed system, or participating even partially in GC).

There are two common modes of attack. In the first, a misbehaving process causes another process to collect objects that are referenced by objects in another process. In the second mode of attack, a non-cooperating process causes another process to retain storage for objects that should be collected. Therefore, there is a need for a distributed garbage collection system that is able to correctly account for references in transit and is also invulnerable to attack by non-cooperating processes.

SUMMARY OF THE INVENTION

The present invention is a distributed garbage collection system and method that meets the needs set out above. More particularly, the present invention is a garbage collection system for use in a distributed object system wherein communications between objects in different processes are rendered transparent through the use of proxy objects and transports. The present distributed garbage collection system works under attack from misbehaving participants.

For the purposes of the present invention, a proxy object is an object resident in a first process that is a local representative of a corresponding remote object resident in a second, different process. Corresponding objects, such as a proxy object and its corresponding remote object, are linked by a pair of transports, a first transport of the pair of transports residing in the first process and including a first in-table and a first out-table matched, respectively, to a second out-table and a second in-table in a second transport of the pair of transports resident in the second process. The pair of transports enables communication between corresponding objects by providing corresponding slots in the first and second in- and out-tables, each in-table slot including a strong pointer to its associated local object.

In the preferred embodiment, a pair of transports provides inter-process object security that complies with the extended definition of capability security by encrypting and decrypting all messages between their associated processes with a secret, agreed key known only to the pair of transports.

The garbage collection system of the present invention includes, in each of a subset of the processes in which objects of a distributed program are executing: a local garbage collector, a registrar object and a secret number table maintained by the registrar for local objects in its process. Each entry in a secret number table includes a unique (to the registrar), practically unguessable secret code associated with a local object and a strong pointer (reference) to that local object. Associated with each in-table slot is a marshaling count that represents the number of out-bound messages referencing the local object associated with the in-table slot. Please note that marshaling counts are not ref counts (i.e., they do not represent the number of references to an object). A transport is configured, upon relaying a message including a reference to a particular local object to a remote object in a different process, to increment the marshaling count for that particular local object.

Additionally, associated with each out-table slot is an unmarshaling count that represents the number of received messages referencing the remote object associated with the out-table slot. A transport is configured, upon receiving a message including a reference to a local proxy, to increment the unmarshaling count for that proxy. A transport is configured, upon all local objects dropping their references to a proxy for which the transport has an out-table entry, to delete the proxy's out-table entry and to issue a forget message to the transport in the process hosting the proxy's sibling. The forget message includes the current unmarshaling count and a slot number identifying the in-table slot associated with the particular object.

A transport is configured, upon receiving a forget message, to subtract the unmarshaling count from the marshaling count associated with the slot number designated in the forget message. The transport is also configured, upon the marshall count going to zero, to (A) delete the designated in-table slot and the strong pointer linking the designated in-table slot to the particular object whose remote references were dropped, and (B) issue a second message to the registrar notifying the registrar that the in-table slot was deleted.

The registrar is configured, upon receiving the second message, to determine whether there are pointers to the particular object in in-table slots provided by other transports in its process, and, when there are no such in-table slots, to delete its strong pointer to the particular object and null out the secret code associated with the particular object. As a result, storage for local objects is only reclaimed by the local garbage collector when it is certain that there are no actual or potential remote references to the local objects.

In the case where the resulting marshaling count is positive, indicating that the remote proxy was dropped while a reference was in transit, the transport manager receiving the forget message does nothing more. In this situation, when the remote transport manager receives the reference, it will rebuild a new proxy using the same slot it just deleted and set that slot unmarshaling count to 1.

The logic of the described system, together with the described cryptographic safeguards, ensures that:

1) references in transit are not omitted from the count;
2) process cannot cause objects referenced by other objects to be dropped; and
3) due to capability security, processes cannot forge a reference and thereby incorrectly prevent garbage from being collected.

The result is a garbage collection system that will work correctly, even when under attack by some of the participants. Misbehaving participants in this system can only damage themselves (and, possibly, each other).

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
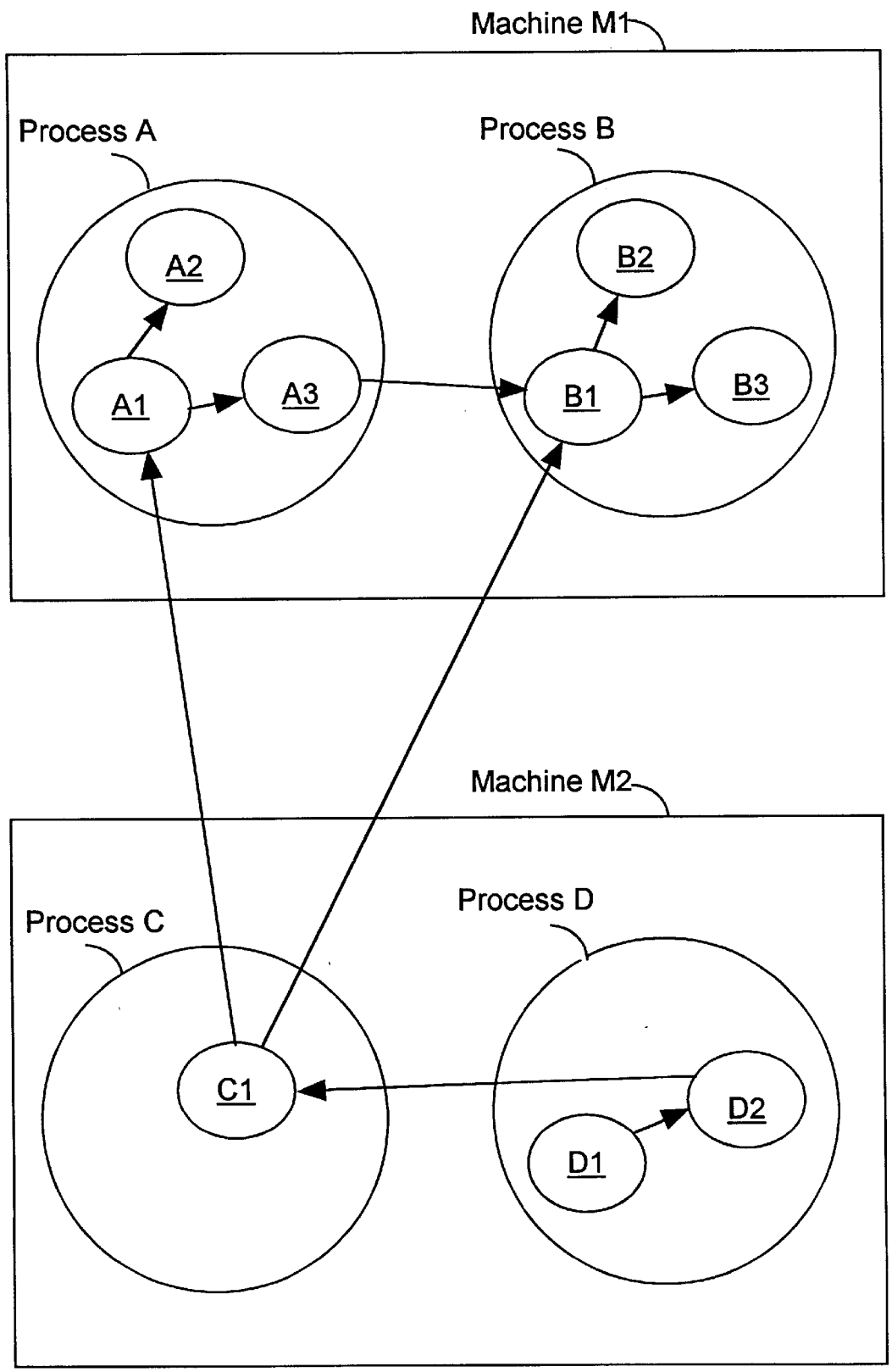
FIG. 1 is a depiction of a distributed object system consisting of two machines, four processes and multiple objects.
Figure 2:
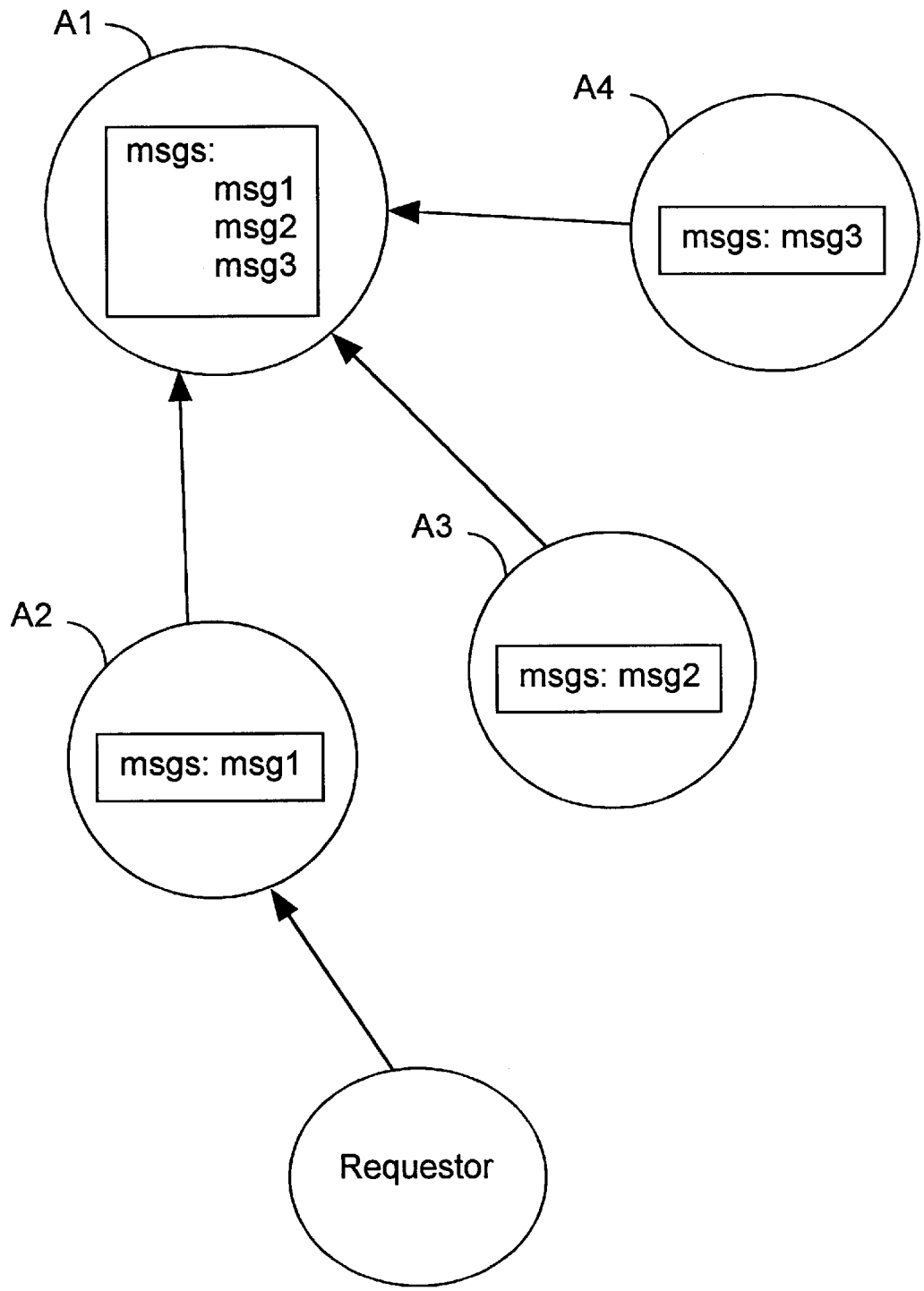
FIG. 2 is a block diagram showing a prior art capability security system for distributed, object-oriented programs.
Figure 3:
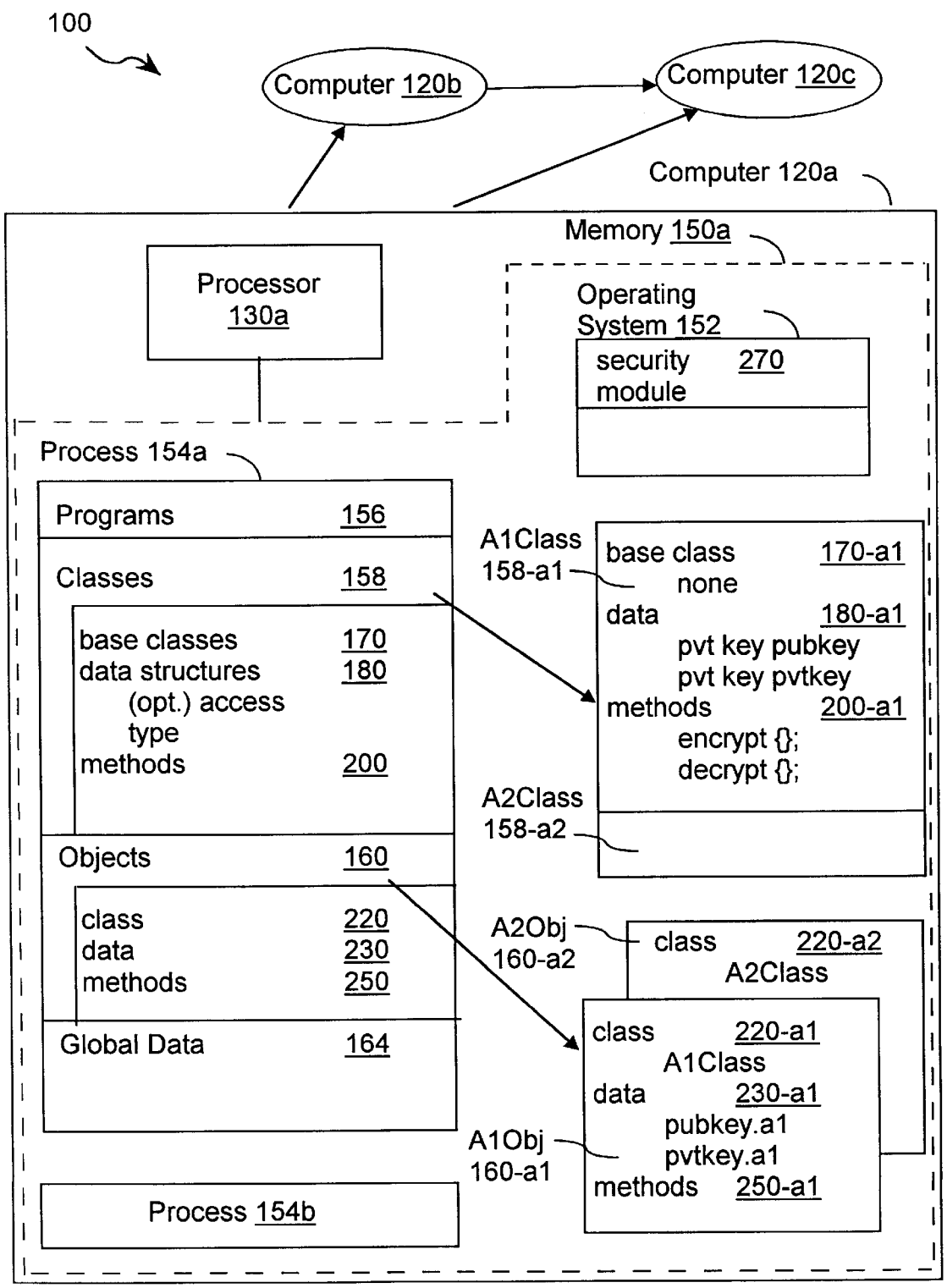
FIG. 3 is a block diagram of a computer system in which the present invention is implemented.

Referring to FIG. 3, there is shown a block diagram of a distributed computer system 100 in which the preferred embodiment of the present invention is implemented. The distributed computer system 100 includes one or more inter-connected computers 120a, 120b, 120c, each of which includes a processor 130 and a memory 150. This memory 150 could be a fast primary memory, such as a random access memory; a cache memory; a slower secondary memory, such as a hard disk; or any combination of those three types. Each of the computers 120 contains similar software and hardware components, details of which are presented for a representative computer 120a.

The memory 150a of the computer 120a includes an operating system 152 and one or more processes 154a, 154b, each of which occupies a separate address space in the memory 150a at runtime. Each process 154 includes programs 156, class and object specifications 158, 160 and a data area 164. The operating system 152 executes in the processor as long as the computer 120 is operational and provides system services for the processor 150 and programs 156 being executed in the processor 150. The operating system 152, besides including the basic components common to most operating systems (not shown), also includes an optional security module 270 that provides routines for secure inter-process object messaging. The programs 156 can be any kind of program, including the object-oriented programs to which the present application is directed.

As is well known, a program 156 written in an object-oriented language, such as C++, includes class definitions 158 and object declarations 160. Each class definition 158 outlines the data structures 180 and methods 200 associated with that class, where a data structure declaration 180 defines the type of the data item (e.g., whether the data item is a pointer, an integer, or a user-defined type) and optionally, the accessibility of the data item (i.e., whether the data item is public, meaning accessible to all objects, or private ("pvt"), meaning visible only within object instances of the declared class). A class definition 158 can also optionally identify one or more base classes 170 from which that class inherits methods and data structures.

For example, referring to FIG. 3, an "A1Class" 158-*a*1 can be defined with the following elements:

(1) base class: none
(2) data structures:
  public_key a private variable of the user defined type "key" that is used by an instance of the class A1 to hold its public encryption key;
  private_key a private variable of the user defined type "key" that is used by an instance of the class A1 to hold its private decryption key;
(3) methods:
  encrypto ( ) { }; a method used by an instance of the class A1 to encrypt outgoing messages with the public key of the receiving object;
  decrypto ( ) { }; a method used by an instance of the class A1 to decrypt incoming messages with its private key;

Objects are instances of one or more classes 158 and incorporate all of the properties (i.e., methods and data structures) of the classes of which they are instances.

In contrast to the classes 158, which, in most object-oriented languages, are defined at compile-time, the objects 160 are run-time entities that, in response to messages received from another object 160, execute their methods and update their own data as a part of program execution. Each object's storage 160 includes a "class" field 220 that indicates the associated classes of which the particular object 160 is an instance and the data 230 and methods 250 that are derived from those associated classes (note: in some object-oriented systems the methods 250 are not held in the object storage 160, but in the associated class 158; however, for the purposes of illustration, the methods are shown as being in the object storage 160). For example, referring to FIG. 3, the "A1Obj" 160-*a*1 is declared to be an object instance of the A1 Class 158-*a*1 via a "class" field 220-*a*1 whose contents are "A1Class". As a result, the data 230-*a*1 and methods 250-*a*1 (not shown) of the A1 Obj 160-*a*1 are as specified for the A1 Class. The values of the data 230-*a*1 can be set through an initialization step after the object is created (constructed) or during program execution and are associated only with that object 160-*a*1. Thus, in the example of FIG. 3, the pubkey.*a*1 and privkey.*a*1 variables represent values associated with a particular instance ("A1Obj") of the A1 Class. If another instance of the A1 Class existed (e.g., A1 Obj', not shown), that other instance would have its own data values (e.g., pubkey.*a*1' and pvtkey.*a*1'). FIG. 3 also shows an A2Obj 160-*a*2, which is an instance of the ClassA2 158-*a*2. As the A2Obj 160-*a*2 is defined similarly to the A1Obj 160-*a*1, no additional details are shown for this object.

As set out above, the basic tenet of capability security is that the right to do something to an object (e.g., invoke a particular object's methods) is represented solely by the holding of a reference to the particular object. The present invention provides a revised formulation of capability security that meets the two constraints set out in the background on acquiring a capability as well as a new rule called the "message integrity rule". The message integrity rule states that:

1. The capabilities the receiver of a message receives correspond exactly to those the sender sent; and
2. Any further information (bits) that the receiver receives also correspond exactly to those the sender sent.

The first clause plugs the loopholes illustrated by the two problems set out in the background and, therefore, provides a more faithful formulation of what has been meant by capability security. The extra precision inherent in the first clause has not been needed in single machine capability systems, because virtually all plausible engineering choices happen to provide implicitly for message integrity. When engineering distributed capability systems, however, the extra precision becomes crucial. In this latter engineering domain, one is more likely not to provide the message integrity property if it has not been articulated.

In each of the preferred embodiments described herein, an object is presumed to hold legitimately a reference to a particular object only if the object knows some unpublicized (except under the conditions required by capability security) key associated with the particular object. In other words, an object reference and an object key can be used to the same effect in these embodiments. Additionally, the system of the present invention ensures that objects seeking access to other objects have acquired those capabilities legitimately. This is accomplished in these embodiments through the use of public key cryptography, Diffie-Helman cryptography or other cryptographic techniques implemented in the objects, wherein a target object uses a secret key to decode messages encoded by the issuing object with the unpublicized key. In the present invention, five embodiments are described, each corresponding to a different way of handling this object-implemented cryptography. The first of these embodiments is presented in FIG. 4A.

Figure 4A:
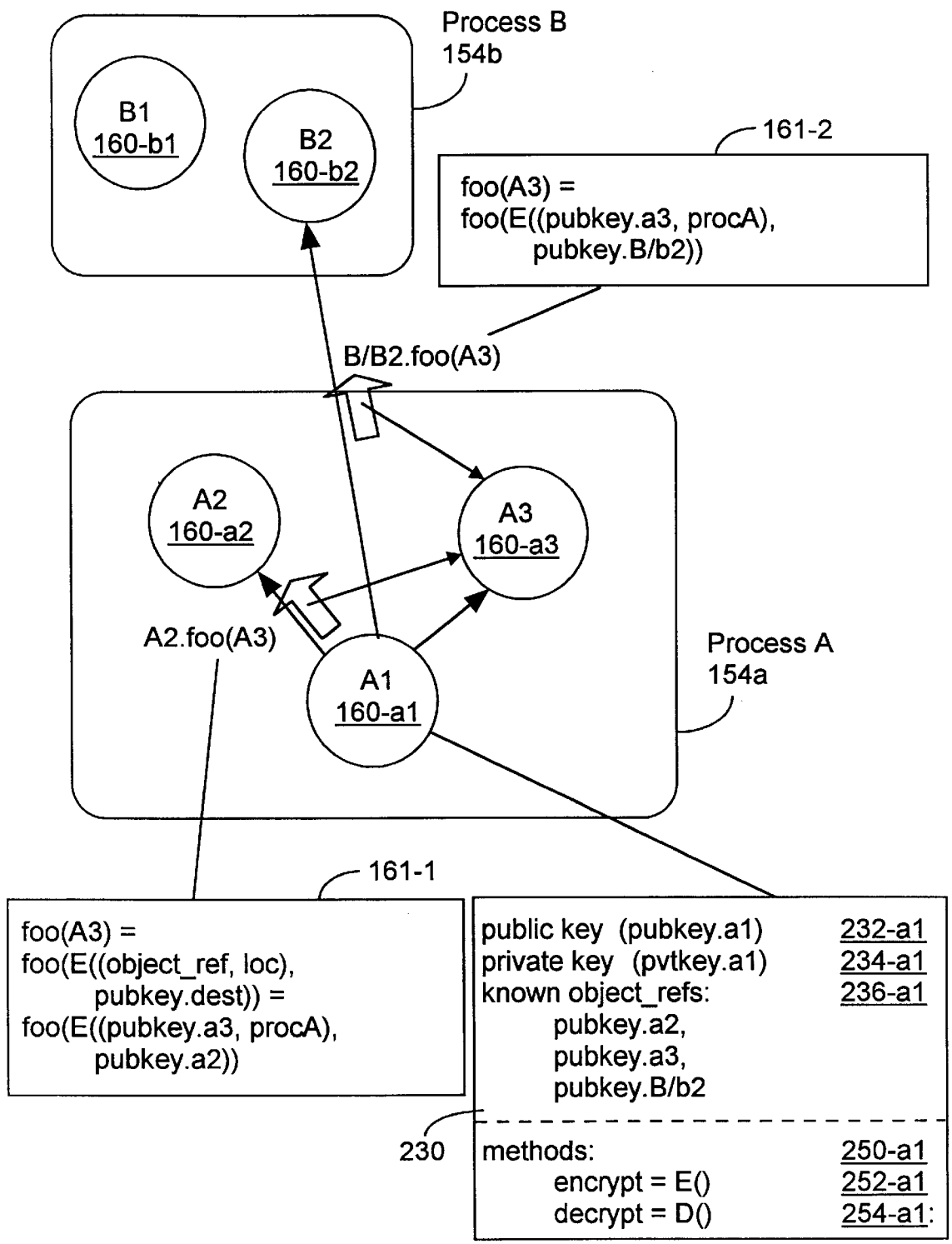
FIG. 4A is a depiction of a preferred embodiment of a capability security system for distributed, object-oriented programs that makes use of public key/private key encryption techniques for all inter-object messages.

Referring to FIG. 4A, there is shown a first preferred embodiment of a system that provides capability security for distributed object systems. As do subsequent figures, FIG. 4A shows (1) the communications links (depicted as directed arrows) between plural objects 160 resident in a multitude of processes 154 and (2) the form of particular messages 161 issued by one object to another along a subset of those links. More particularly, the embodiment of FIG. 4A is illustrated for a Process A 154$a$ that includes three objects: A1 160-$a$1, A2 160-$a$2 and A3 160-$a$3, and a Process B 154$b$ that includes two objects: B1 160-$b$1 and B2 160-$b$ 2. Each of these objects is an instance of a respective class. For example, the objects A1 and A2 are instances of the classes ClassA1 158-$a$1 and ClassA2 158-$a$2 (FIG. 3), respectively.

In this document, the terms "public key" and "private key" refer to pairs of encryption/decryption keys, where messages encoded with a public key can be decoded only through use of the corresponding private key. For the purposes of the present application, the public keys are not made freely available; instead, they are publicized by their associated objects only on a very restricted basis (i.e., according to conditions imposed on object reference passing by capability security). The private keys are truly private and are typically never transmitted.

In the preferred embodiment of FIG. 4A, each object 160 has a data area 230 that includes a unique public key ("pubkey") 232 and private key ("pvtkey") 234 that can be used to encode and decode messages transmitted to and received by that object. In this and subsequent figures, the object and location associated with a particular key is indicated after that key's name or reference number. Thus, object A1 160-$a$1 has respective public and private keys pubkey.$a$1 232-$a$1 and pvtkey.$a$1 234-$a$1. The data area 230 also includes a list of all object public keys (i.e., references 236) that are known to a particular object 160. These object references 236 constitute the list of objects an object is authorized to access. Thus, the object references 236-$a$1 for the object A1, which has communications links to the objects A2, A3 and B2, include pubkey.$a$2, pubkey.$a$3 and pubkey.B/$b$2. Each of these object references 236-$a$1 includes the referenced object's public key and the object's location. All of this information is contained in the name of the object reference 236-$a$1. For example, the reference "pubkey.B/$b$2" corresponds to the encryption key of object "$b$2" in the process "B".

As described in reference to FIG. 3, each object also includes methods 250 inherited from its associated class. In the embodiment of FIG. 4A, these methods 250 include an encryption routine "E( )" 252 and a decryption routine "D( )" 254 that are used by the objects 160 respectively to encrypt and decrypt messages sent to and received from other objects. In this preferred embodiment, the methods 252, 254 are known from public key-private key cryptography. As is well known, using public key-private key cryptography, messages may be (1) encrypted by a sender with the sender's private key before transmission and then, after transmission, decrypted by the intended receiver using the sender's public key, or (2) encrypted by a sender with the intended recipient's public key before transmission and then, after transmission, decrypted by the intended receiver using the intended receiver's private key. Method (1) is known as signing and is not used by the preferred embodiment. The preferred embodiment employs the methods 252, 254 (using the intended recipient's key pair) to guarantee that (1) only the intended recipient can decode a message passing an object reference 236, and (2) no object can spoof another object into believing that the spoofing object has an object reference 236 it doesn't possess. By providing these guarantees, the embodiment of FIG. 4A is able to provide capability security for distributed object systems.

In the embodiment of FIG. 4A, object references are sent by one object to another object using a message "foo( )" 161. Each message 161 includes the following fields:
(1) the object reference (i.e., the public key) of the referenced object; and
(2) the location (process and machine) of the referenced object.

In this and all other embodiments, the object reference and the location together define a capability (i.e., within a capability security regime, an object can only access another object if it knows that object's public key and location). Before issuing this message 161, the sending object encrypts this information using the encryption method E( ) 252 and the public key of the intended recipient object. In FIG. 4A and subsequent figures, these encrypted messages 161 are described with the syntax: E((message contents), pubkey.destination). For example, the message foo( ) issued by A1 to A2 wherein the object A1 passes the object reference for object A3 to object A2 is represented as "E((pubkey.$a$3, procA), pubkey.$a$2)". In some of the subsequent figures, the object whose reference is being passed is indicated by a pointer originating in a hollow arrowhead that corresponds to the message.

In the interests of transparency, the same syntax (i.e., receiver.foo( )) can be used to issue an (encoded) message to an object that is not local to the object that is passing the object reference. For example, to pass the remote object B2 a reference for the object A3 (i.e., pubkey.$a$3), the object A1 forms the message 161-2 shown in FIG. 4A. The only differences between this message 161-2 and the message 161-1 is that the message 161-2 is encoded with the public key of the object B2 (pubkey.B/$b$2). Also, note that the encoded message, "B/B2. foo( )", indicates the full path to the object B2 ("B/$b$2", which is short for "Process B, object $b$2").

Upon receiving an encoded message (e.g., A2.foo), an object decodes the message using its decoding method D( ) 254 and private key pvtkey 234 and adds the decoded public reference to its list of known object_refs 236. This decoding step ensures that only the object that is the intended recipient of an object reference can actually receive that reference.

Because object references are equivalent to public keys, which are controlled according to the tenets of capability security, it is not possible for a misbehaving object to appear to hold a capability it does not have or to masquerade as another object. Also, a misbehaving object cannot eavesdrop on messages to another object because all inter-object messages are encoded and can only be decoded by the intended recipient using its private key. Thus, this embodiment is particularly useful in a class of current object-systems where objects co-resident in a process use common data structures, such as a blackboard, to broadcast messages to one another. Even though such blackboard systems do not allow objects to manufacture references to or to reach into other objects (one aspect of capability security), they do not provide capability security because the messaging channel (i.e., the blackboard) is not secure, being accessible to all communicating objects. However, a blackboard system consistent with the teachings of this embodiment; i.e., where objects encode and decode their messages, can provide object-to-object communications that are secure within the extended definition of capability security.

The embodiment of FIG. 4A provides true capability security for distributed objects. However, this embodiment is not suitable for transparent distributed object systems because it requires an object to know the destination (including process and machine) of the objects with which it communicates. This embodiment is also extremely inefficient as it requires all messages relayed between objects to be encoded and decoded using public-key encryption techniques, whether or not the communicating objects are co-located (in the same process). Public-key encryption and decoding is expensive in terms of the CPU resources used. This overhead is reduced in the embodiment of FIG. 4B.

Figure 4B:
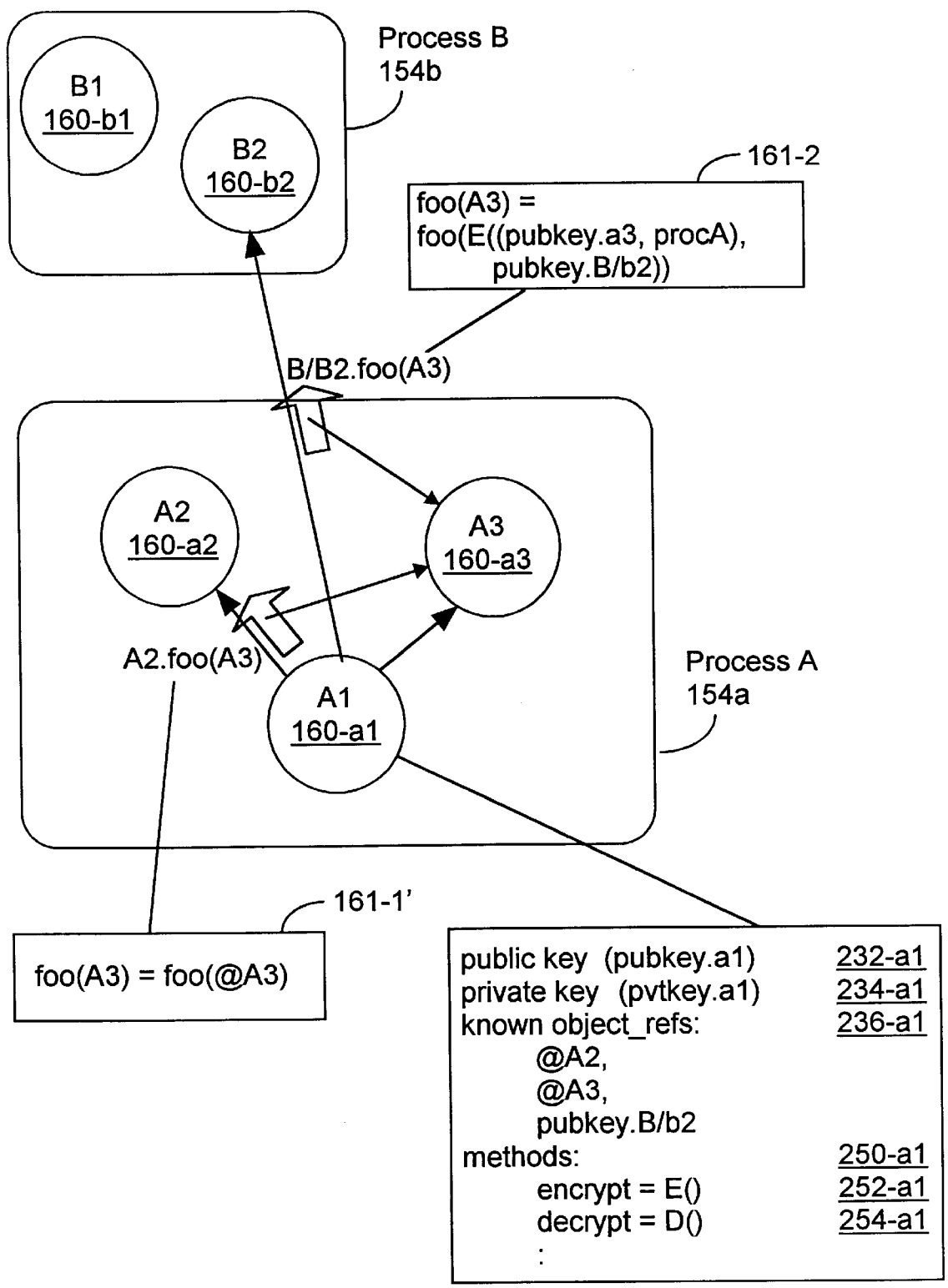
FIG. 4B is a depiction of an alternate preferred embodiment of a capability security system for distributed, object-oriented programs that makes use of public key/private key encryption techniques only for inter-process messages.

Referring to FIG. 4B, there is shown an alternate preferred embodiment of a capability security system for distributed, object-oriented programs that makes use of public key/private key encryption techniques. The only difference between the embodiments of FIGS. 4A and 4B is that, instead of encrypting and decrypting all messages 161, as in FIG. 4A, the embodiment of FIG. 4B encrypts only the messages 161 that are transmitted between different processes and/or machines. This means that all local messages 161 (i.e. messages between objects in a single process) are sent plain-text between objects that are identified by language-level pointers, not public keys. An acceptable level of security for local messages 161 can be provided by the optional, operating system security module 270 and, sometimes, by features of the object-oriented language in which the programs 156 were written.

The data area 230 of each object 160 holds the local pointers of known objects alongside the public keys of the remote objects for which object references are available. For example, the known object_refs 236-a1 section of the object 160-a1 include two language-level pointers, "&A2" and "&A3" ("&" denotes a local address), which are, respectively, pointers to the local objects A2 and A3. Because the object B2 is not local, its public key, pubkey.B/b2, is still stored in the object_refs 236-a1. In this embodiment, messages issued to remote objects, such as the message 161-2, are the same as in the embodiment described in reference to FIG. 4A. The local messages are, however, different from those shown in FIG. 4A. This is because no encryption is used for local messaging and, as a result, object references can be passed directly between co-located objects. For example, the message 161-1', which accomplishes the same purpose as the message 161-1 (FIG. 4A), includes only the pointer to the object A3 ("&A3").

This embodiment is more efficient than that of FIG. 4A. However, there is still some inefficiency in this system due to the computational overhead associated with the double key cryptography performed on all non-local, messages. This inefficiency is addressed by the system shown in FIG. 5.

Figure 5:
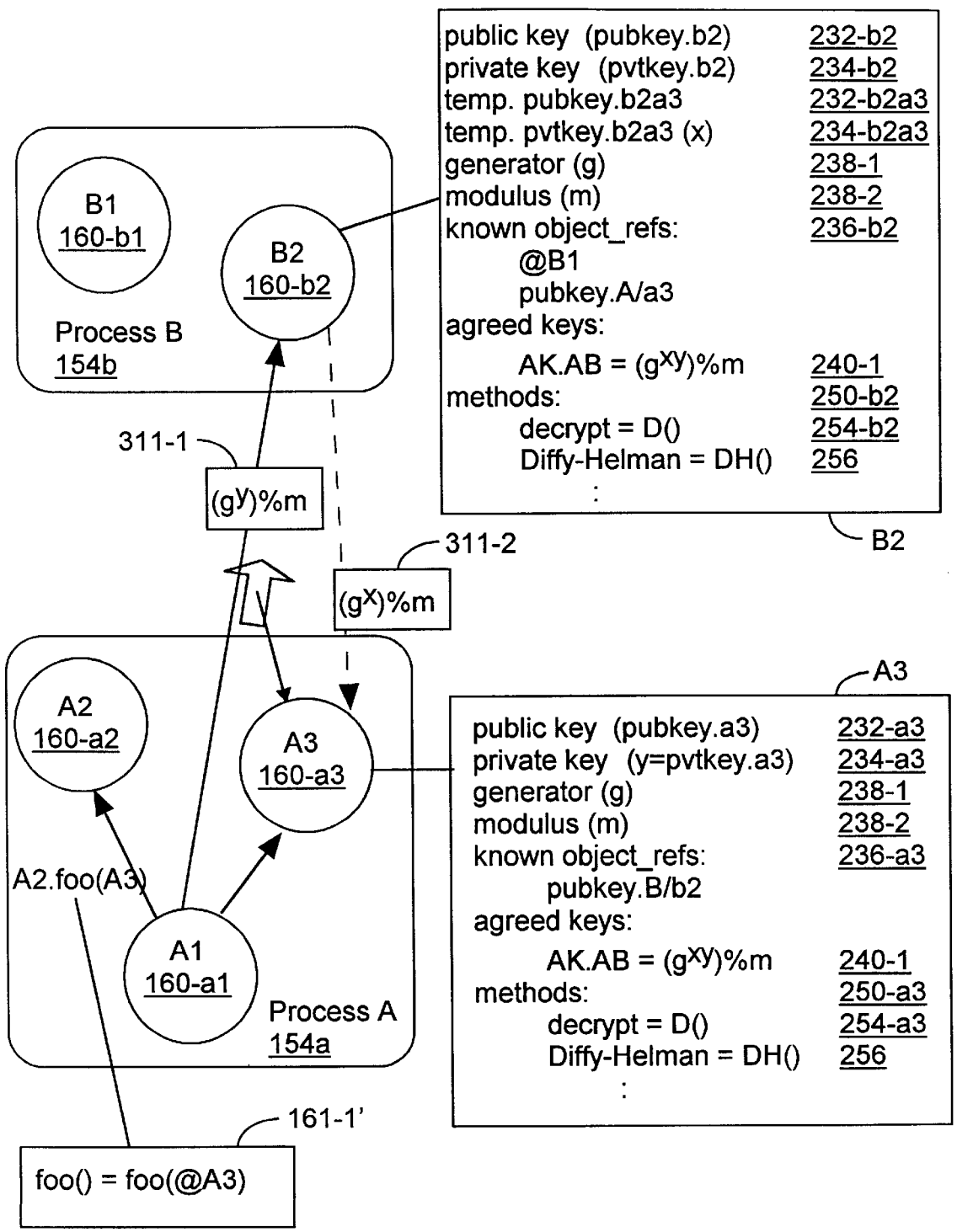
FIG. 5 is a depiction of a preferred embodiment of a capability security system for distributed, object-oriented programs that makes use of Diffie-Helman key exchange encryption techniques to provide security between objects.

Referring to FIG. 5, there is shown a depiction of a preferred embodiment of a capability security system for distributed, object-oriented programs that makes use of Diffie-Helman (also known as key exchange) cryptography to provide security between objects in different processes. As in the system of FIGS. 4A and 4B, this embodiment is illustrated for two processes, a Process A, which includes three objects (A1, A2 and A3) and a Process B, which includes two objects (B1 and B2). It is immaterial to the operation of the present embodiment whether these processes are in the same or different machines. In addition to the information stored by the objects 160 in the embodiments of FIGS. 4A and 4B, each of the objects 160 includes a generator 238-1 and a modulus (m) 238-2, which are described below. Each of the objects 160 also includes respective public and private keys 232, 234. For example, the object A3 has keys 232-a3, 234-a3 ("y") and the object B2 has keys 232-b2, 234-b2 ("x"). As in the previous embodiments, the objects 160 (FIG. 5) perform the encryption and decryption steps that allow capability security to be provided for distributed object systems. These steps are embodied in the method DH( ) (short for Diffie-Helman) 256, which is included in each of the objects 160. Aternatively, any type of key-exchange or agreed-key cryptography can be substituted for the Diffie-Helman techniques.

Additionally, note that the present invention does not strictly require that all links between processes support encryption. Rather, the true requirement is that links between processes must be secure for the present invention to maintain capability security. In an environment where processes are mutually suspicious and links are suspect, link security is only possible when inter-process messages are encrypted. However, in a trusted environment such as an intranet (a proprietary network accessible only to corporate employees), inter-process and inter-machine links are reasonably secure and no encryption is required. In such a trusted environment, the teachings of the present invention provide capability security without any encryption or decryption of messages (e.g., with the public key of the recipient). Alternatively, the preferred embodiment can also provide capability security in distributed object systems where the machines are trusted and the only cryptography is provided by the link (e.g., by a link, such as a Netscape Secure Socket Layer (SSL), that provides encrypted, bidirectional data streams between machines). These principles apply the teachings of the present invention as described in reference to FIGS. 4 through 12.

FIG. 5 shows a situation where A1 is passing B2 an object reference (public key) 311-1 for the object A3. In this preferred embodiment, rather than B2 simply using the public key 311-1 to encode its messages to A3, B2 uses the public key 311-1 to generate with A3 (according to Diffie-Helman's teachings) a single agreed key (AK) that B2 and A3 can use to encrypt and decrypt their messages to one another.

Each object 160 has a public key ("pubkey") 232 of the form shown in equation 1, where "g", "m", "pvtkey" and "%" respectively designate the generator, modulus, the object's private key and the arithmetic modulo operation. As the object A3 has a private key "y" 234-a3, its particular public key 232-a3 can be represented as shown in equation 2. This value 232-a3 is packaged in the message 311-1 when A1 sends B2 the object reference to A3.

$$pubkey=(g^{pvtkey})\% \, m \qquad \text{Eq. (1)}$$

$$pubkey.a3=(g^y)\% \, m \qquad \text{Eq. (2)}$$

Upon receiving the message 311-1, B2 generates a special private key ("x" 234-b2a3) for sending messages to A3 and receiving return results (this is not the same as B2's identifying private key 234-b2), computes a matching public key (pubkey.b2a3 232-b2a3) according to equation 1 (i.e., pubkey.b2a3=(g^x)% m) and sends the special public key 232-b2a3 to the object A3 in the message 311-2. Upon receiving the message 311-2, A3 computes the agreed key (AK 240-1) for receiving messages from B2 and returning results from its own private key and B2's special public key 232-b2a3 as shown in equation 3. Due to properties of modulo arithmetic, this value can be more simply represented as shown in equation 4.

$$AK=((g^y)\% \, m)^x \% \, m \qquad \text{Eq. (3)}$$

$$AK=(g^{xy})\% \, m \qquad \text{Eq. (4)}$$

Due to these same modulo properties, B2 is also able to compute the agreed key AK 240-1 without any further exchange of keys with A3. This ensures that the agreed key 240-1 is completely secure (as it was generated by the objects using their private keys and was never broadcast). Once the AK 240-1 is known to both objects, B2 and A3 can send secure messages using the AK as the single key in a single key encryption scheme (e.g., DES). Also, once the AK 240-1 has been generated, B2 can delete the special purpose key pair pubkey.$b2a3$ and pvtkey.$b2a3$; B2 still needs to store A3's public key to be able to pass references to A3. The advantage of this embodiment is that two objects in different processes can still pass object references in such a way that capability security is maintained while avoiding the overhead of public key encryption. On the other hand, the advantage of the previous embodiment is that it implicitly provided some degree of non-repudiation, by virtue of its direct use of public key cryptography, while this embodiment does not. However, since a goal of the present invention is to produce a faithful implementation of capability security, and capability security is not defined to include the property of non-repudiation, this lack is not a problem.

The above technique would seem to give A3 access to B2, because B2 has given A3 its public key. This would appear to be a security problem, since there are situations in which B2 should be able to access A3 but not vice-versa. However, the use of special purpose keys prevents this problem.

Another drawback of this embodiment is that the process of generating agreed keys between all combinations of objects that need to communicate across processes is costly in terms of processor time and memory usage, especially if the communication channel is only going to be used for a few messages. Some of these inefficiencies are addressed by the embodiment of FIG. 6.

Figure 6:
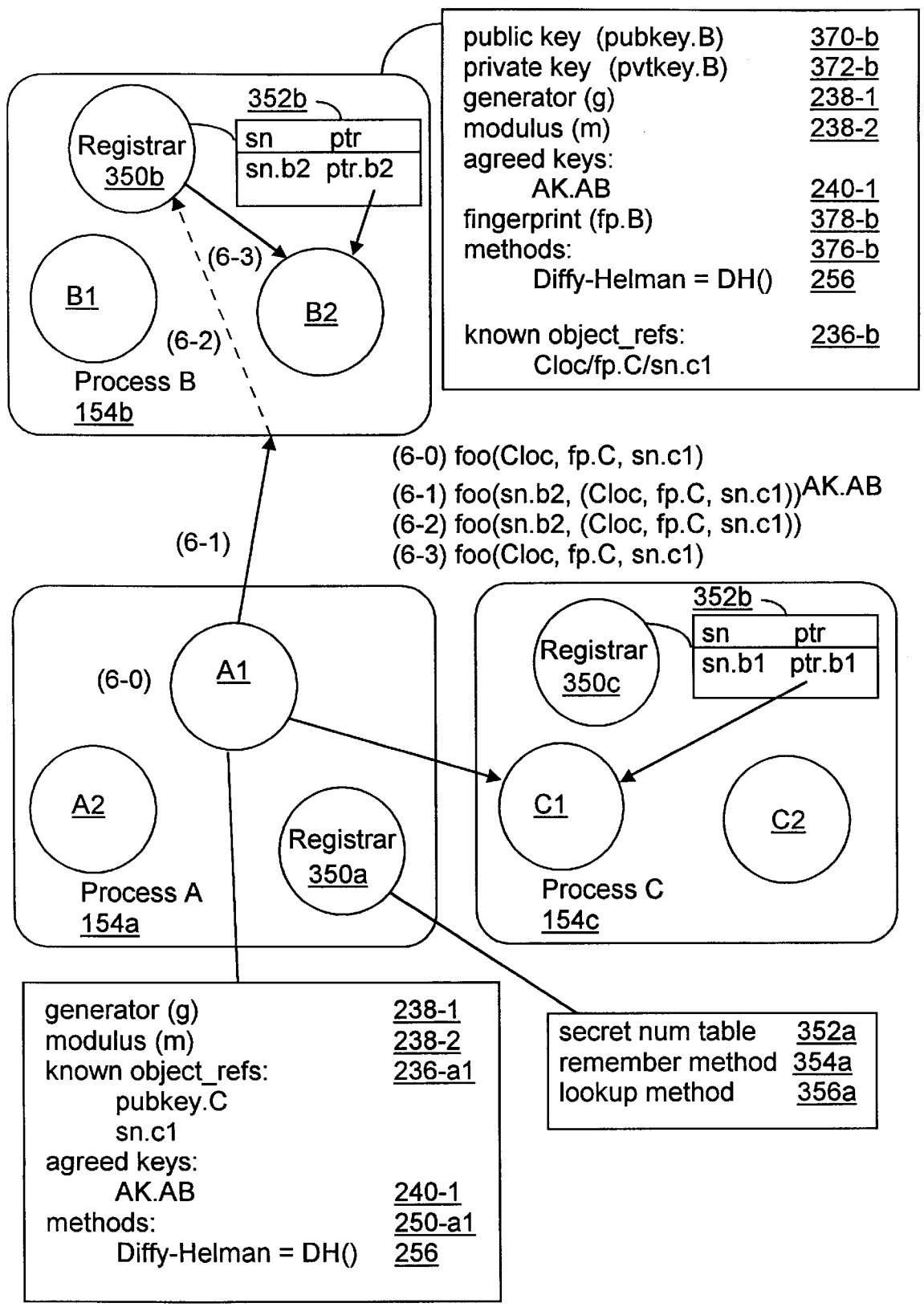
FIG. 6 is a depiction of a preferred embodiment of a capability security system for distributed, object-oriented programs that makes use of Diffie-Helman key exchange encryption techniques to provide security between processes.

As does the embodiment of FIG. 5, the embodiment of FIG. 6 also employs Diffie-Helman cryptography. However, instead of requiring an agreed key to be generated for every pair of objects involved in inter-process messaging, this embodiment only requires that one agreed key AK be generated per process pair (this implies that each process must have public and private keys) and that the processes, not the objects, perform the necessary encryption and decryption. Accordingly, a process 154 includes data such as a public key 370, a private key 372, a generator 238-1, a modulus 238-2, known object references 236, agreed keys 240 for communicating with other processes, such as the agreed key AgK.AB 240-1 used by process B for communicating with process A, and methods 376, such as Diffie-Helman DH( ) 256. In the preferred embodiment, each process also includes a fingerprint 378 (e.g., 378-$b$), which is the hash of the process's public key 370. The fingerprint 378 is a much smaller substitute for the public key 370 (e.g., whereas a typical Diffie-Helman public key has on the order of 1000 bits, a reasonable fingerprint needs only to be between 64 and 128 bits in length) and can be used as a substitute for the public key when two processes are establishing a secure Diffie-Helman communications channel. One requirement for choosing the hash function used to generate the fingerprint 378 is that it must be highly unlikely for a third party to generate a public key that hashes to that same value. One such hash function that is employed by the present invention generates a fingerprint 378 equaling the 128 low-order bits of the public key 370.

In this embodiment, anytime a pair of processes for which an agreed key exists need to communicate, they simply use the agreed key of that pair of processes as the key in a single key encryption scheme (note: a new agreed key 240 is generated each time a new connection is established between a pair of processes). For example, an object A1 in the process A only needs to know the agreed key for the process pair AB (e.g., AK.AB) to send an encrypted message (e.g., a message) to an object B1 in the process B. If they do not already have an agreed key, then two processes can generate their agreed key as described in reference to FIG. 5 as long as one of the processes knows the public key of the other process or, alternatively, the fingerprint of the other process. For example, assuming that process A wants to establish a secure inter-process channel with process B and only knows B's fingerprint 378-$b$, process A would first issue a message asking the process with the fingerprint 378-$b$ (i.e., process B) to return its public key 370-$b$. Process B would then return its public key 370-$b$ to process A, which uses the fingerprint 378-$b$ and the appropriate hash function to verify that the returned public key was indeed from process B. Once process A has verified process B's public key, the two processes can establish their Diffie-Helman agreed key AK-AB as already described.

Of course, without additional security between objects, a misbehaving object could access any object in any process whose agreed key is known to the misbehaving object. For example, as long as A1 knows the agreed key for the process pair AB, it could send a message to the object B2, even if not authorized to do so.

To prevent this problem, the preferred embodiment of FIG. 6 includes in each process a "registrar" object 350, which maintains a table of unguessable secret numbers 352 for co-located objects (i.e., objects in its own process). Alternatively, any kind of secret code can be used in lieu of secret "numbers". And, of course, by "unguessable" it is meant that the secret numbers of the present invention must be practically unguessable given the ever-changing state of computer power and cryptography. The registrar objects have access to a random number generation method for generating unguessable secret numbers, which in the preferred embodiment are at least 64 bits in length. Each registrar 350 also includes a remember method 354 that registers unique secret numbers for objects when there is a need for an inter-process reference for a previously un-registered object and a lookup method 356 that handles all inter-process communications directed to registered objects in its process. Because secret numbers are known only to the appropriate registrar and to objects that have the capability to access registered objects across process boundaries, this embodiment preserves capability security for distributed objects. Also, because the individual objects do not have to handle the task of generating unique agreed keys for any objects with which they wish to communicate, the present embodiment does away with much of the overhead of the previous embodiments.

Thus, referring to FIG. 6, before the object A1 can pass an object reference for the object C1 to the object B2, the object A1 must first know the agreed key for the process pair A-B ("AK.AB"), the network location of process C ("Cloc"), process C's public key ("pubkey.C"), from which one can authenticate C, and the secret number for the object C1 ("sn.C1"), which indicates that A has the capability to access C1. Once it has this information, the object A can form a message (6-0) consisting of C's location, C's fingerprint (fp-C) 378-C (generated by A from C's public key) and C1's secret number. A1 then forms an encrypted message (6-1) by prepending to the message (6-0) B2's secret number (which the registrar 350$b$ uses to locate B2) and encrypting the augmented message using the agreed key for the process pair AB (AK.AB). In this embodiment, encryption is represented using superscript notation. Thus, the message (6-1) is represented as (sn.B2,(Cloc, fp.C, sn.C1))$^{AK.AB}$) Finally, A1 sends the encrypted message (6-1) to Process B, which, upon receiving the message (6-1), decrypts it using the agreed key AK.AB. This step allows process B to verify that the encrypted message was actually sent by an object in process A (which prevents spoofing). Process B then sends the decoded message (6-2) to its registrar 350*b*, which verifies the secret number of the recipient (i.e., B2). Once it verifies the secret number, the registrar 350*b* sends the unpackaged object reference (6-3) to object B2, which stores the information in its list of known object refs 236-*b*2. In this embodiment, an object ref consists of an object's location and cryptographic information (process public key and object secret number). Thus, as shown in FIG. 6, the object reference for C1 stored in B2's data area 236-*b*2 is "Cloc/ fp.C/sn.C1", where "Cloc" is the location of process C, "fp.C" is process C's fingerprint and "sn.C1" is object C1's secret number. Of course, C's public key could be substituted for the fingerprint fp.C in the messages (6-0) through (6-3).

Diffie-Helman cryptography utilizes single key encryption for communication between two entities once an agreed key has been computed, which is, generally, significantly more computationally efficient than public key cryptography. The extra overhead associated with computing an agreed key is more than made up by lower computational requirements of single key encryption so long as a reasonable number of messages are transmitted using the agreed key.

While the embodiment of FIG. 6 efficiently provides capability security for distributed object systems, it is also less than transparent. This is because an object must format messages differently when communicating with co-located objects as opposed to remote objects. In the prior art, there are well-known methods that provide transparency in distributed object systems; albeit without capability security. One such system is shown in FIG. 7, which is now briefly described.

Figure 7:
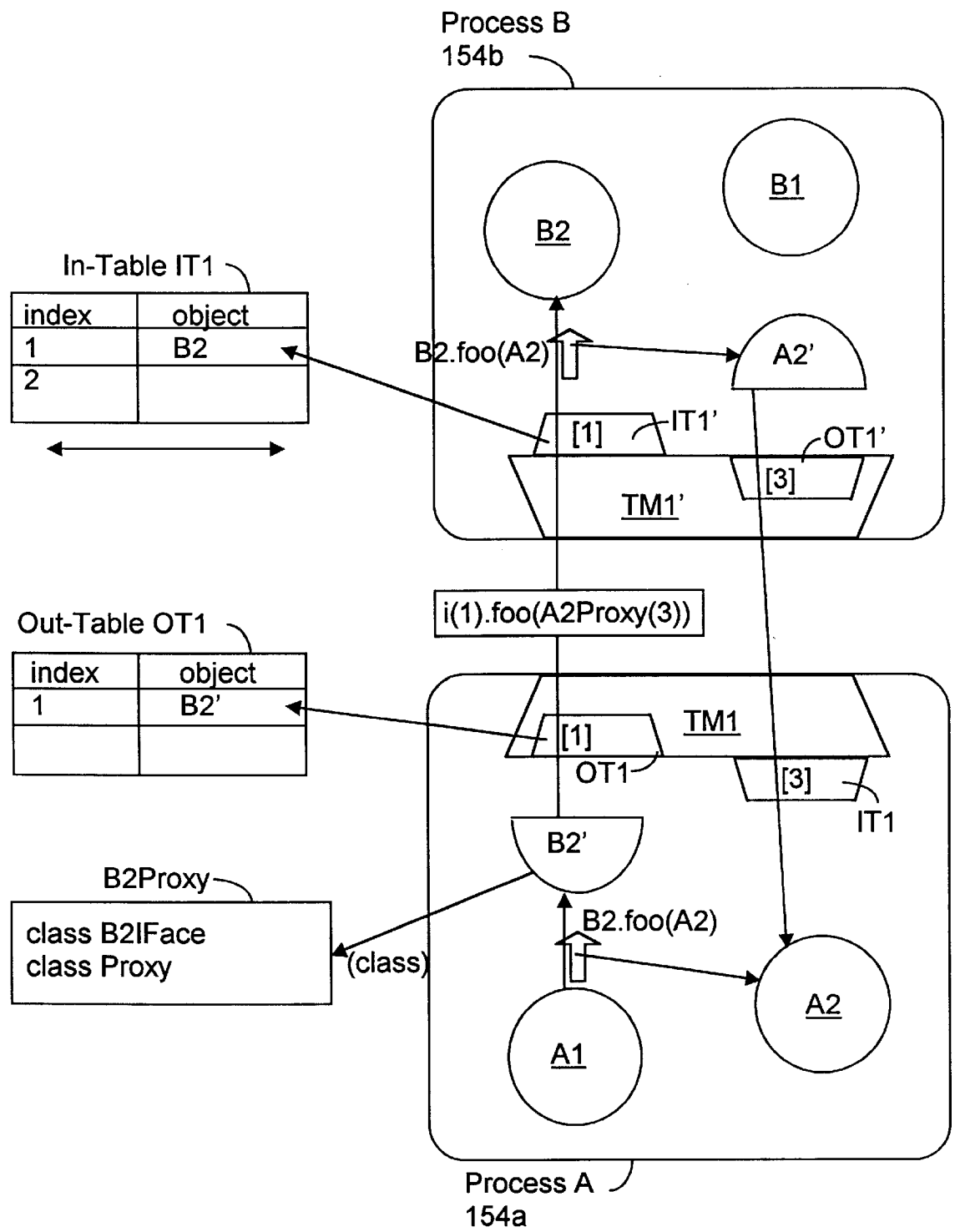
FIG. 7 is a depiction of a prior art transparent distributed object system.

The prior art system in FIG. 7 provides transparency in distributed object systems through the use of object proxies, which act as intermediaries between objects in different processes, and transport managers (TM), which handle inter-process communications and create and destroy proxies as needed. In this system, objects pass messages using only language pointers/local addresses (i.e., an object only needs to know how to pass messages within its object space). Of course, in a distributed object system, not all objects with which an object needs to interface are located in the same process. Therefore, when a first object needs to hold a reference to a remote object, a local proxy object is created in the first object's process to act as a local stand-in for the remote object (the proxy's "sibling"). I.e., the proxy object picks up messages intended for its remote sibling by local objects and ensures that those messages are delivered, via a transport manager, to its sibling. To enable these functions, each proxy object inherits from two interfaces: (1) the interface of the object for which it is a proxy (so it can respond to all of its sibling object's messages) and the "Proxy" interface, which defines the methods associated with all proxies. For example, an object proxy B2' is an instance of B2IFace and Proxy.

For an object to forward a message via a proxy to its remote sibling requires a pair of transport managers (TM), one in each process. Each TM has an in-table (IT) and an out-table (OT). An in-table contains pointers to local objects, using indices corresponding to those used by the corresponding out-table in the corresponding TM for the corresponding proxy. Each proxy knows its index in the local out-table. When a message is sent to a proxy, the proxy forwards it to its sibling (identified by the index), repackaging any arguments as described below.

It is not necessary that a proxy and its remote share the same index in corresponding in- and out-tables. Instead, it is only necessary that (a) the transport manager can derive the in-table index of the remote object from information specific to the particular proxy.

Arguments to be sent by value (e.g., strings, numbers, boolean values) are encoded directly. Arguments that are local objects which are already known to the remote process are encoded using their index in the remote process's out-tables. Local objects for which the remote process does not have an entry are first added at a new index in the local process's in-table and then encoded as a known local object. Objects that are locally known via a proxy to the destination process are encoded using their index in the destination TM's in-table. Objects which are local proxies to objects stored somewhere other than the destination process require a three-party handoff (described below in reference to FIG. 9), When an incoming message is received by a TM, it finds the receiver in the in-table corresponding to the source of the message using the slot identified in the message (e.g., "i(1)" in FIG. 7). Arguments sent by value are created directly from their encoding. Arguments that are local to the destination system are decoded (as was the receiver itself) by look-up in the destination TM's in-table. Objects which are local to the source are decoded by look-up in the destination out-table (e.g., "A2Proxy(3)" in FIG. 7). If the indicated slot in the out-table is empty, a new proxy is created at the indicated index with the indicated type.

For example, as shown in FIG. 7, assume that the object A1 is trying to pass an object reference for the local object A2 to the remote object B2. Because B2 is remote from A1, a proxy object B2' exists in process A for the remote object B2. The proxy object B2' is an instance of the B2IFace and Proxy classes. The transport managers TM1 and TM1' coordinate communications between the processes A and B. These transport managers TM1 and TM1' link B2's proxy and B2 by respectively assigning the objects B2' and B2 a slot index of 1 in the output and input tables OT1, IT1'. Note that the in-tables IT are defined using a two-way mapping (indicated by the two-headed arrow below the respective columns) that allows a transport manager to look-up an object in the IT by index (when pulling a message to the object off the wire) or identity (when determining whether there is an in-table entry for the object). The out-tables OT only allow objects to be looked-up by index.

A1 initiates the process of sending the object reference for A2 to B2 by issuing the language level message "B2.foo (A2)". This message is picked up by the local proxy object B2', which in turn issues the message "i(1).foo(A2)" to the transport manager object TM1. This message tells the transport manager TM1 to issue an appropriate message containing a reference for A2 to its sibling TM1' via index 1 of its in-table IT1' (this is the index shared by B2 and B2'). The transport manager TM1 responds by looking-up A2 by identity in its in-table IT1. If there is no entry for A2, TM1 allocates an entry with an unused index. If there is an entry, TM uses the existing index. Once it has determined or allocated the in-table index for A2 (in this case, 3), the transport manager TM1 issues the network message "i(1) .foo(A2Proxy(3))" to TM1'. This message tells the remote transport manager object TM1' to issue the language level message "foo(A2)" to the local object "B2" associated with the in-table index 1, thereby completing the process of passing the object reference for the object A2 to the object B2. Once B2 knows about A2', it can issue language-level messages to A2' (e.g, "A2'.foo( )"), which are handled by the A2Proxy and the transports TM1, TM1' as described above.

This prior art system provides transparency for distributed object-oriented systems. However, it provides no security. This failing is addressed by the embodiment of the present invention shown in FIG. 8, which, building on some of the concepts from the embodiment of FIG. 6, provides capability security for transparent, distributed, object-oriented systems such as the one of FIG. 7.

Figure 8:
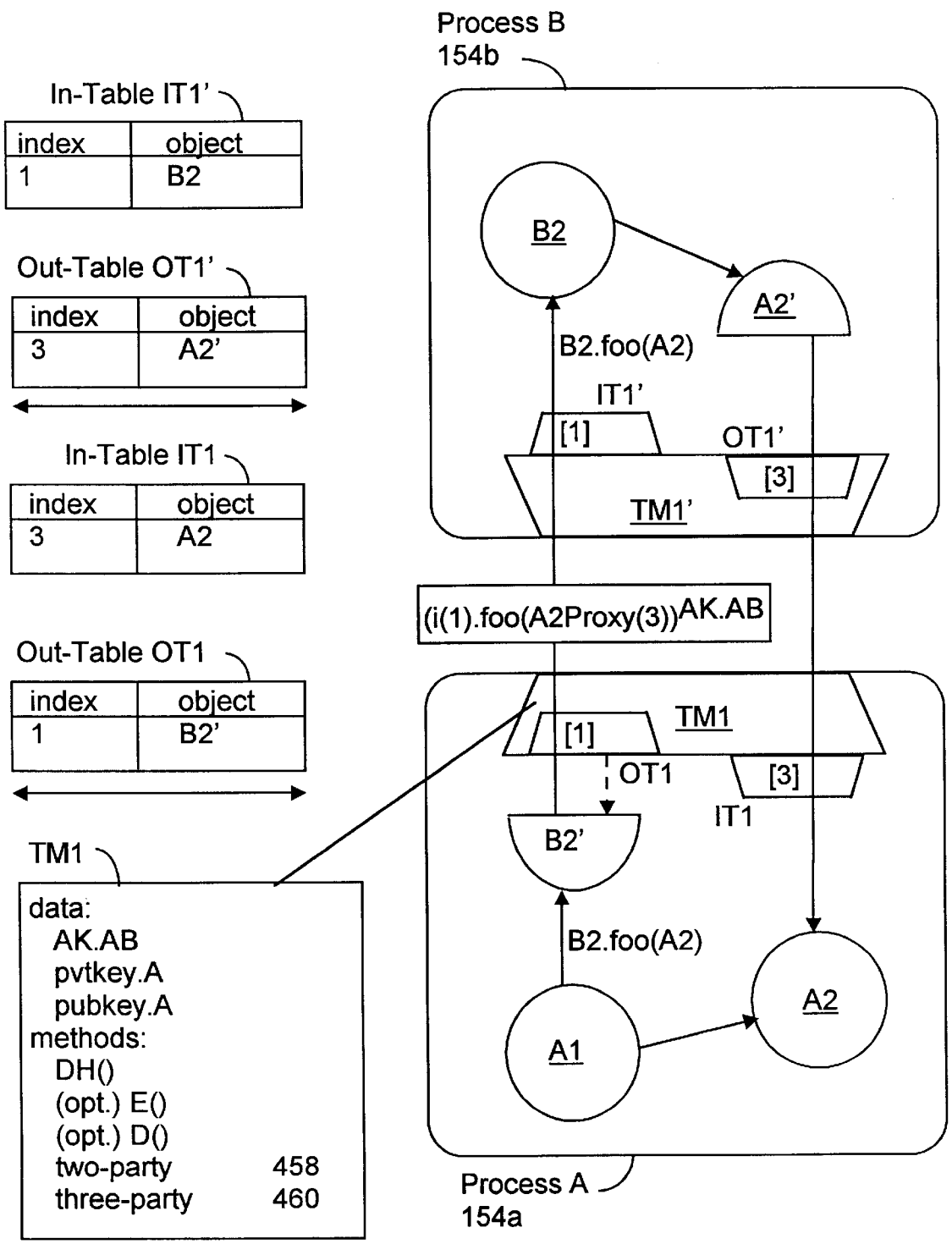
FIG. 8 is a depiction of a preferred embodiment of a capability security system for transparent, distributed, object-oriented programs that makes use of Diffie-Helman key exchange encryption techniques to provide security between processes.

The embodiment of FIG. 8 includes the same basic components as FIG. 7 (i.e., processes, transports, in-tables, out-tables, objects and object proxies). Unlike the embodiment of FIG. 7, the transport managers of FIG. 8 include an additional security method that enables them to encrypt and decrypt inter-process messages sent between their associated processes. In the preferred embodiment, this method is the already discussed DH( ) 156, which enables transport pairs to generate an agreed key in accordance with Diffie-Helman key exchange cryptography as described in reference to FIG. 6. For example, in FIG. 8, the transports TM1 and TM1' would use the method DHO to generate a single agreed key AK.AB associated with the processes A and B. Aternatively, each of a pair of transports TM could have its own public and private keys and public key encryption and decryption methods E( ), D( ), which the transport manager could use to securely encrypt and decrypt inter-process messages. In this embodiment, because all security and inter-process message transmission functions are handled by the transport mangers TM, the individual objects do not have to be concerned with cryptography or where a particular object is located, which enables capability security to be provided for transparent distributed object systems. As in the embodiments described previously, in the embodiment of FIG. 8 encryption is only performed for inter-process messages. All local messages are passed using language-level pointers with security provided by the operating system or the computer language.

The operation of this preferred embodiment is now described for the following two situations:

(1) where an object passes an object reference for a co-located object to an object in a different process (FIG. 8), which situation is handled by a two-party method 458 associated with the transport managers; and (2) where an object passes an object reference for an object located in a second process to an object located in a third process (FIGS. 9A, 9B, 9C), which situation is handled by a three-party method 460 associated with the transport managers.

These examples are by no means exhaustive. However, the way this preferred embodiment operates in other situations (e.g, where the referenced object and the sending and receiving objects are co-located or where only the referenced and receiving object are co-located) follows from these descriptions.

The first situation, shown in FIG. 8, largely proceeds as described in reference to FIG. 7, with the addition of encryption and decryption steps performed by the transport managers TM1 and TM1'.

It is noted here that slots in each transport manager's in-table are assigned by a method associated with the transport manager. More specifically, any object requiring an index value for an in-table slot calls an in-table slot assignment method, passing as an argument a language pointer to a specified object for which an in-table slot is required. The slot assignment method determines if the specified object has already been assigned a slot, assigns an unused slot if the object has not already been assigned a slot, and then returns the object's assigned slot number.

As in FIG. 7, A1 initially issues the message B2.foo(A2), which is picked-up by the proxy object B2' (recall, a proxy object is responsive to the same messages as its sibling). B2' relays this message to the transport manager TM1, designating B2 as the recipient by using the index common to both B2 and B2' (i.e., 1). The transport manager TM1, making used of its two-party method 458, encrypts the corresponding network message (e.g., i(1).foo(A2Proxy(3))) using either public/private key or Diffie-Helman techniques. The encrypted message $(i(1).foo(A2Proxy(3)))^{AK.AB}$ is then relayed by the transport manager TM1 to TM1'. The transport manager TM1' decrypts the received message and, if the proxy does not already exist, creates an object instance A2' of the class "A2Proxy", associates the object A2' with the out-table index 3 in OT1' and issues the message B2.foo(A2) ("A2" in this message is equivalent to "A2'"). Once the message has been delivered, the proxy object A2' can be used by B2 (and other objects in process B) to issue messages to the object A2. Note that access to the proxy object A2' is limited according to the tenets of capability security to only those process B objects that know its reference. Process B objects without this capability are prevented by internal language services from obtaining this reference. Other, remote, objects are also not able to obtain this reference due to the encryption and decryption that is performed by the transports TM1, TM1'. Thus, the preferred embodiment described in reference to FIG. 8 provides for the secure, transparent transfer of object references between objects in two different processes.

The second situation differs from the two process situation described in reference to FIG. 8 in that, due to the requirements of capability security, the object in the third process (i.e., the object that is the intended recipient of the message) cannot make use of the in-table and out-table index of the referenced object in the transport managers that coordinate communications and security between the processes of the sending and referenced objects. This is because slot indices are private to the transport managers that maintain them and to objects in the corresponding processes that have the capability to access the objects associated with those particular slot indices. If access to transport managers were shared among more than two processes, a misbehaving process could pretend to have access to objects counter to the rules of capability security by creating local proxies corresponding to indices it merely guessed. To prevent this, processes have a separate transport manager for each process with which they are in communication. Each transport manager's out-table only holds references to objects that were already provided to the process corresponding to that TM. Therefore, a misbehaving process can only communicate with objects to which each of its correspondents allows it access.

Furthermore, because there is no correspondence between the slot indices assigned by different transport pairs to objects, there is no implication that the slot index used by a particular pair of transport managers for one object would be used by another pair of transport managers for the same object. Thus, in the three process case, one way a meaningful object reference can be passed for a particular object is to use as the particular object's reference an invariant value that is associated with that object as long as remote references to the object exist. This preferred embodiment uses a secret number maintained by the registrar for objects in the registrar's process as this invariant value. How the preferred embodiment uses these secret numbers is now described in reference to FIGS. 9A, 9B and 9C, each of which shows a different stage of the process by which the object A1 passes a reference for the object C1 to the object B1, all of which are resident in different processes.

Figure 9A:
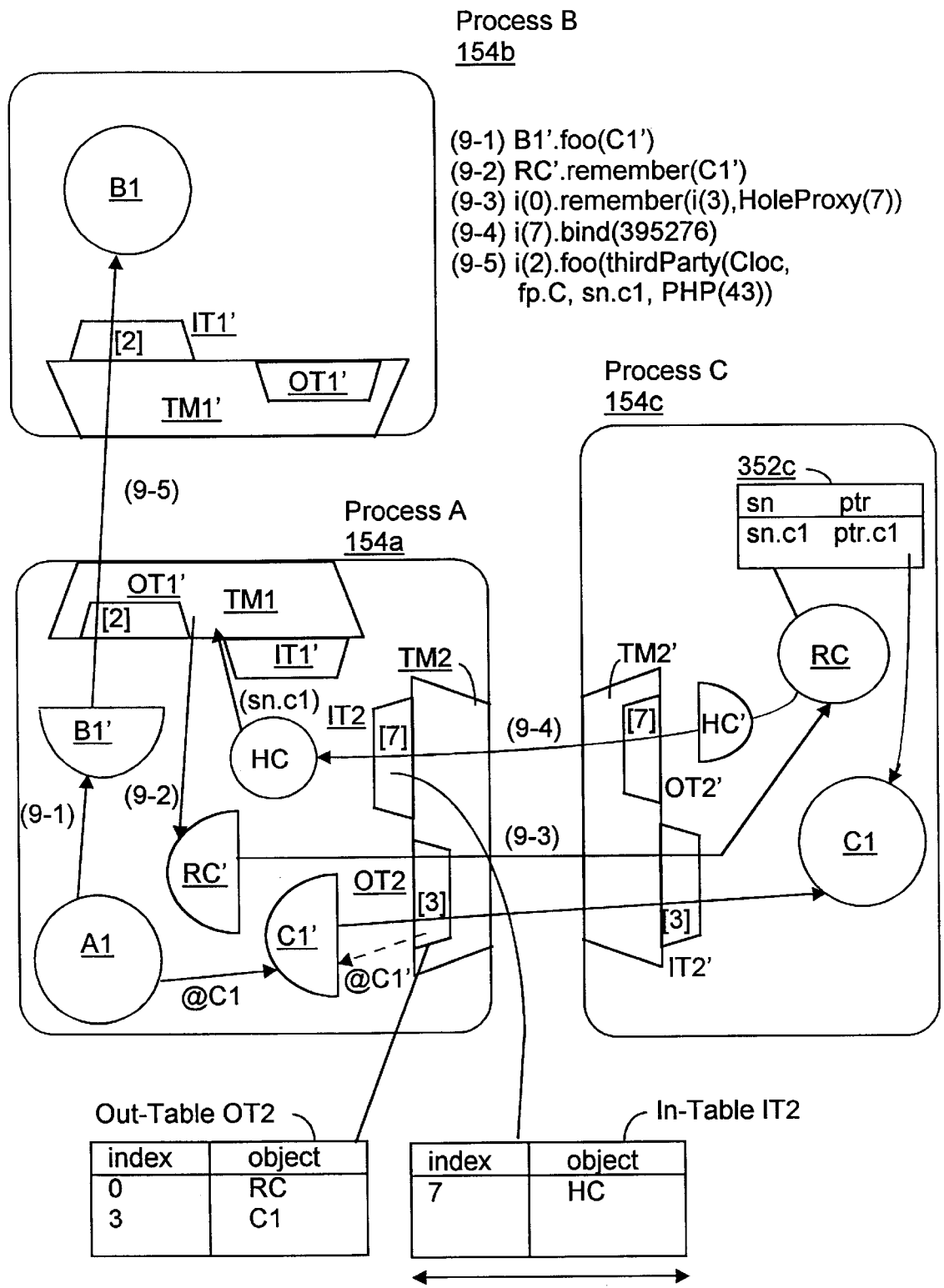
FIG. 9A is a depiction of a first step in a third-party object reference passing operation as implemented by a preferred embodiment of a capability security system for transparent, distributed, object-oriented programs that makes use of Diffie-Helman key exchange encryption techniques to provide security between processes and secret numbers to provide security between objects passing object references across more than two processes.

Referring to FIG. 9A, there is illustrated the first stage of the three-process object-reference passing situation. This figure shows three processes, A, B and C, each of which includes a respective registrar RA (not shown), RB (not shown), RC and program object A1, B1, C1. Process A also includes a registrar proxy RC' and a C1 proxy object C1', which can be used by objects in Process A to communicate transparently with the registrar RC and the object C1, respectively. In the preferred embodiment, every process has a registrar object. Whenever two processes set up a transport manager pair (as described above) registrar proxies are automatically generated in each process to enable communication with the other process's registrar.

Inter-process communication services between the processes A and B and the processes A and C are provided respectively by the transport manager pairs TM1, TM1' and TM2, TM2'. As described above, each of these transport managers includes in-tables IT and out-tables OT, wherein an object and its proxy are linked using a common slot index. In FIG. 9A, the object C1 has already been assigned the slot index 3 in both OT2 (in TM2) and IT2' (in TM2'). This slot index is the object reference that is used in two-process reference passing situations. The object C1 has also been assigned the secret number sn.C1, which is stored in the secret number table 352c maintained by the registrar RC. In the three-process case, this secret number sn.C1 constitutes the object reference that is passed to B1 as a result of A1 issuing B1 a message referring to C1. How this secret number is provided to B1 has to do with interactions between the sending object A1, the sending transport manager TM1, the process C registrar proxy RC' and its analog, the registrar proxy RC. A key to these interactions is the way the preferred embodiment allows objects (including transport managers) to access remote registrars via slot indices in paired transport managers such as TM2 and TM2'.

In the preferred embodiment each registrar is assigned a fixed slot index of 0 in all transport managers. Consequently, whenever an object needs to send a message to a remote registrar, it relays the message to the appropriate registrar's proxy object, which then routes the message to its analog via the slot index 0 of corresponding out and in tables. For example, the object TM1 issues a message to the registrar RC by sending the message to "the object in process A whose out-table index in the transport manager TM2 is 0" (the part in quotes represents the object reference of the registrar proxy RC').

The transport manager TM2 encrypts the message and then relays the encrypted message to slot 0 of the in-table of the transport manager TM2'. The transport manger TM2' then decrypts the message and automatically passes the decrypted message on to the registrar RC.

The third-party handoff situation requires the various objects to support call-return messaging, which is where a sending object issues a message that requires the recipient to return a value to the sending object. This feature is not assumed to be provided by the foundations of the distributed object system of the present invention, where all of the messaging might be one way. However, the preferred embodiment achieves the effect of call-return messages through "hole" objects, which are created specifically to be bound to a value returned by an initial message recipient using a second message. As with other objects in this transparent, distributed-object system, hole objects are linked across different processes with common slot indices in a pair of input and output tables. Referring to FIG. 9A, the objects HC and HC' represent such a pair of hole objects that are used in the third-party handoff situation. How these hole objects are created and used will become apparent in the course of the following description. The teachings of the present invention with regard to the third-party handoff situation are also applicable to any N-process message passing situation, where N is an integer greater than 3.

In the present example, the object A1 initiates a third party handoff to B1' of a reference to C1' by issuing the language-level message "B1'.foo(C1')" (9-1). As in the two-party case of FIG. 8, this message is relayed by B1' to TM1, which associates B1 and B1'. Upon receiving the message 9-1, the TM1 realizes that C1' is a proxy that is related to a third-process (C), which realization causes the TM1 to invoke its third-party method 460.

As the first step in this third-party method 460, the TM1 requests the secret number of the object C1 by issuing the remember message 9-2 to the registrar corresponding to C1'. At the language level, this message is represented as "RC'.remember(C1')". Note that TM1 finds the local registrar (RC') for C1' by sending the message C1'.registrar( ). The remember message 9-2 is picked up by the registrar proxy object RC' and relayed to the transport manager TM2 with the receiver designated with the slot index 0. This is the slot index used by RC' to communicate with the registrar RC. In response, TM2 creates a hole object HC to be bound to the secret number returned by RC and associates HC with an available slot index (7) in the in-table IT2. The TM2 also issues the network message 9-3 "i(0).remember((i(3), HoleProxy(7))", which tells the remote object associated with slot index 0 in the in-table IT2' (i.e. the registrar RC) to generate ("remember") a secret number associated with the object with slot index 3 in the in-table OT2 (i.e., the object C1) and create a hole proxy (HC1') in process C with an associated slot index of 7 in the out-table OT2' (the hole proxy HC' is actually created by the transport manager TM2'). This hole proxy HC' is used by the registrar RC to return the value of C1's secret number to the hole object HC. Finally, the TM2 waits for the secret number sn.C1 to be bound to the hole object HC and, when that occurs, returns the secret number sn.C1 to the TM1. The registrar RC generates a secret number for C1 (e.g., 395276) and stores it in its secret number table 352c.

Once the hole proxy HC' exists, the registrar RC issues a bind message 9-4 ("i(7).bind (395276")), which specifies the in-table slot index, i(7), of the hole object HC and C1's secret number, to which the hole object HC is to be bound. This message is picked up by HC' (which shares the slot index 7 with HC) and returned to HC via the slot index 7 of the transport managers TM2' and TM2.

Once TM1 knows C1's secret number, it issues the network message 9-5 ("i(2).foo(thirdParty (Cloc, fp.C, sn.C1, PHP(43)"). This message is relayed through the transport manager TM1' to the object B1, which has a slot index in the in-table IT1' of 2. The argument of the message "foo(. . )" indicates that the message is a thirdparty object reference ("thirdParty") for an object with the following location and cryptographic information:

(1) Cloc the network location of process C, which is used by process B to locate process C;

(2) fp.C the fingerprint of process C, which process B will use to get and verify C's public key;

(3) sn.C1 C1's unguessable secret number, which acts as the network object reference to the object C1; and (4) PHP(43) A submessage that tells process B to construct a proxy object of the class proxyHolderProxy associated with index 43 in the out-table OT1'. The proxyHolderProxy and its associated proxyHolder in process A exist only until the object B1 has been able to establish its own two-process link with the object C1.

Figure 9B:
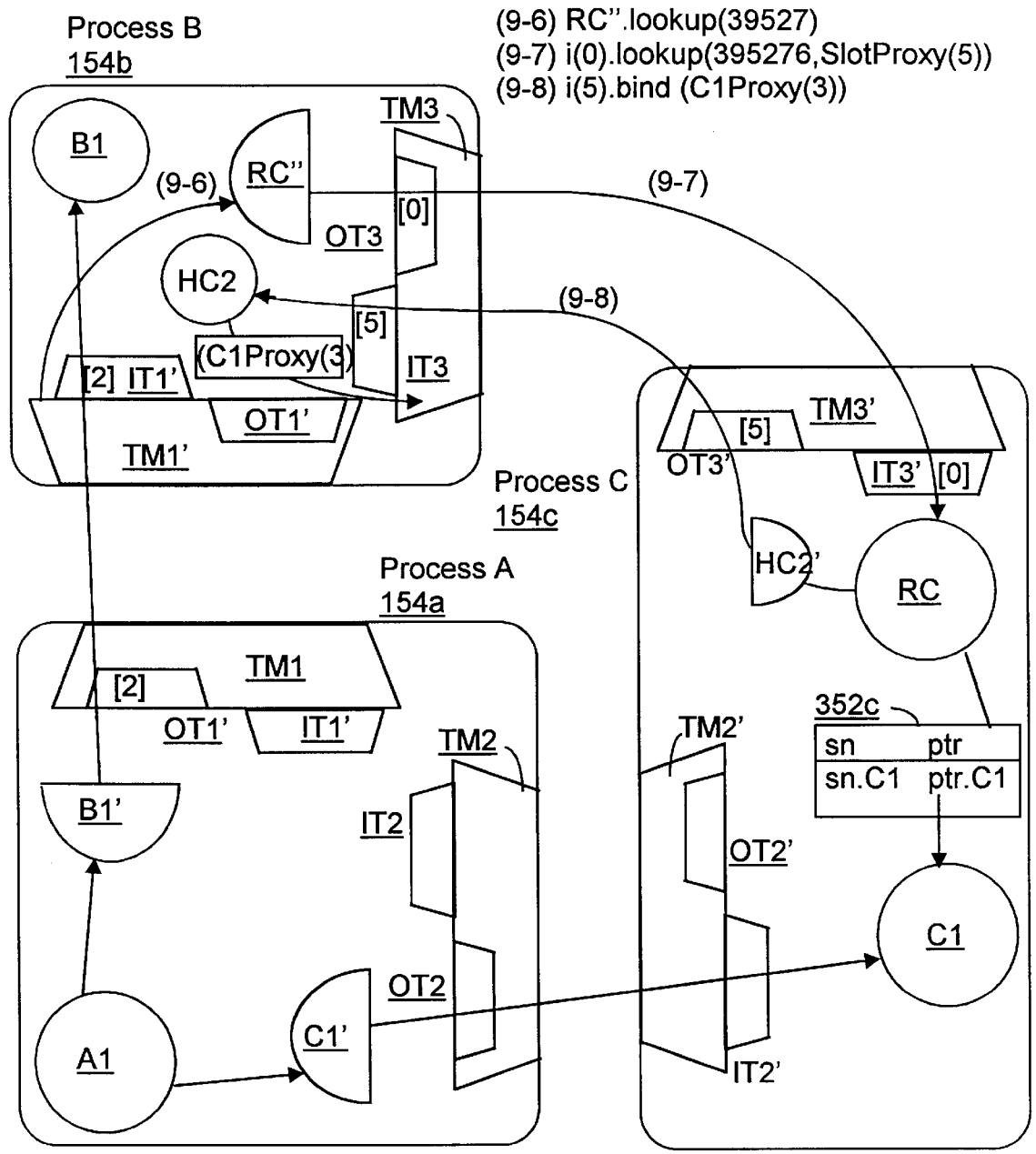
FIG. 9B is a depiction of a second step in a third-party object reference passing operation as implemented by the preferred embodiment of FIG. 9A.

Referring to FIG. 9B, there is shown a diagram of the second stage of the three-process reference passing situation. At this point, the object TM1' has received the message 9-5. As a result, TM1' establishes a secure communications channel with process C consisting of a third pair of transports TM3, TM3', each of which includes the corresponding out-table and in-table pairs OT3, IT3 and OT3', IT3'. In response to the third-party message ("thirdParty"), TM1' constructs a registrar proxy RC" that is linked to the process C registrar RC via slot index 0 of the out-table OT3 and the in-table IT3'.

Once this infrastructure is in place, TM1' issues the language level message 9-6 (RC".lookup(39527)), which RC" forwards through TM3 as the network message 9-7 ("i(0).lookup(395276, HoleProxy(5)"). This message tells the registrar RC to lookup in its secret number table 352c the local object whose secret number is 395276 (i.e., object C1) and then form a HoleProxy HC2' associated with slot index 5 of its out-table OT3' for relaying an object reference for object C1 to object B1 (as in FIG. 9A, a hole proxy HC2 exists in process B to receive the return value, in this case, the object reference).

In processing the "lookup" message, the registrar RC directs TM3' to reserve an index (3) in its out-table for the referenced object C1 and issues a language-level hole bind message ("HC2'.bind (C1 proxy)") to the hole proxy HC2'. The hole proxy HC2' relays this message to TM3', and then TM3' relays an equivalent network message 9-8 ("i(5).bind (C1 proxy(3))") to TM3. This causes TM3 to deliver the bind message to the hole object HC2, which, as a result, binds the return value, "C1 Proxy(3)". Upon the occurrence of this binding, TM1' constructs an object of the class C1 Proxy (a proxy for a C1 object instance), or C', associated with the slot index 3 in the out-table OT3, which corresponds to the in-table slot index reserved for the object C1 in the transport manager TM3.

Figure 9C:
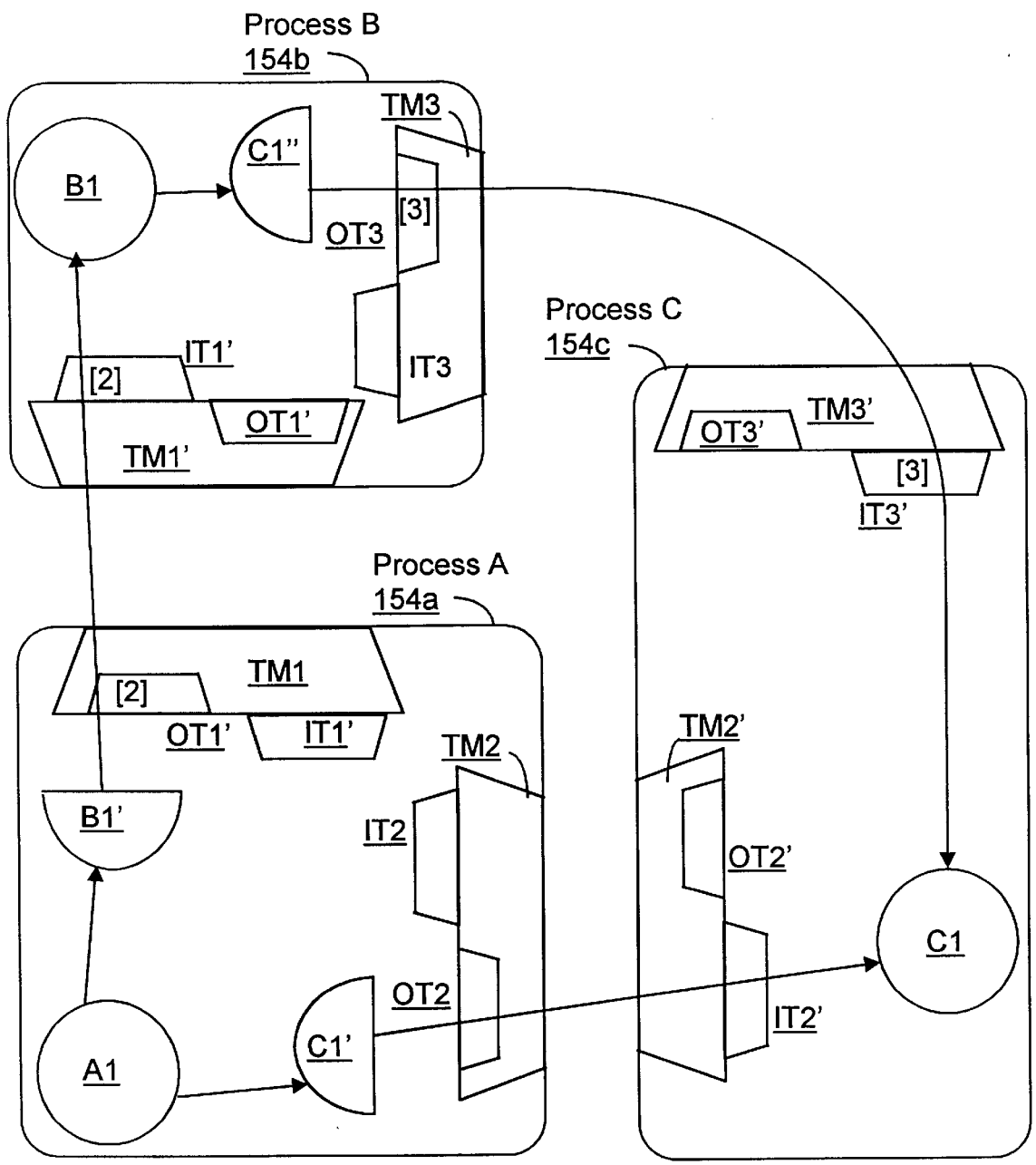
FIG. 9C is a depiction of a third step in a third-party object reference passing operation as implemented by the preferred embodiment of FIGS. 9A and 9B.
Figure 9D:
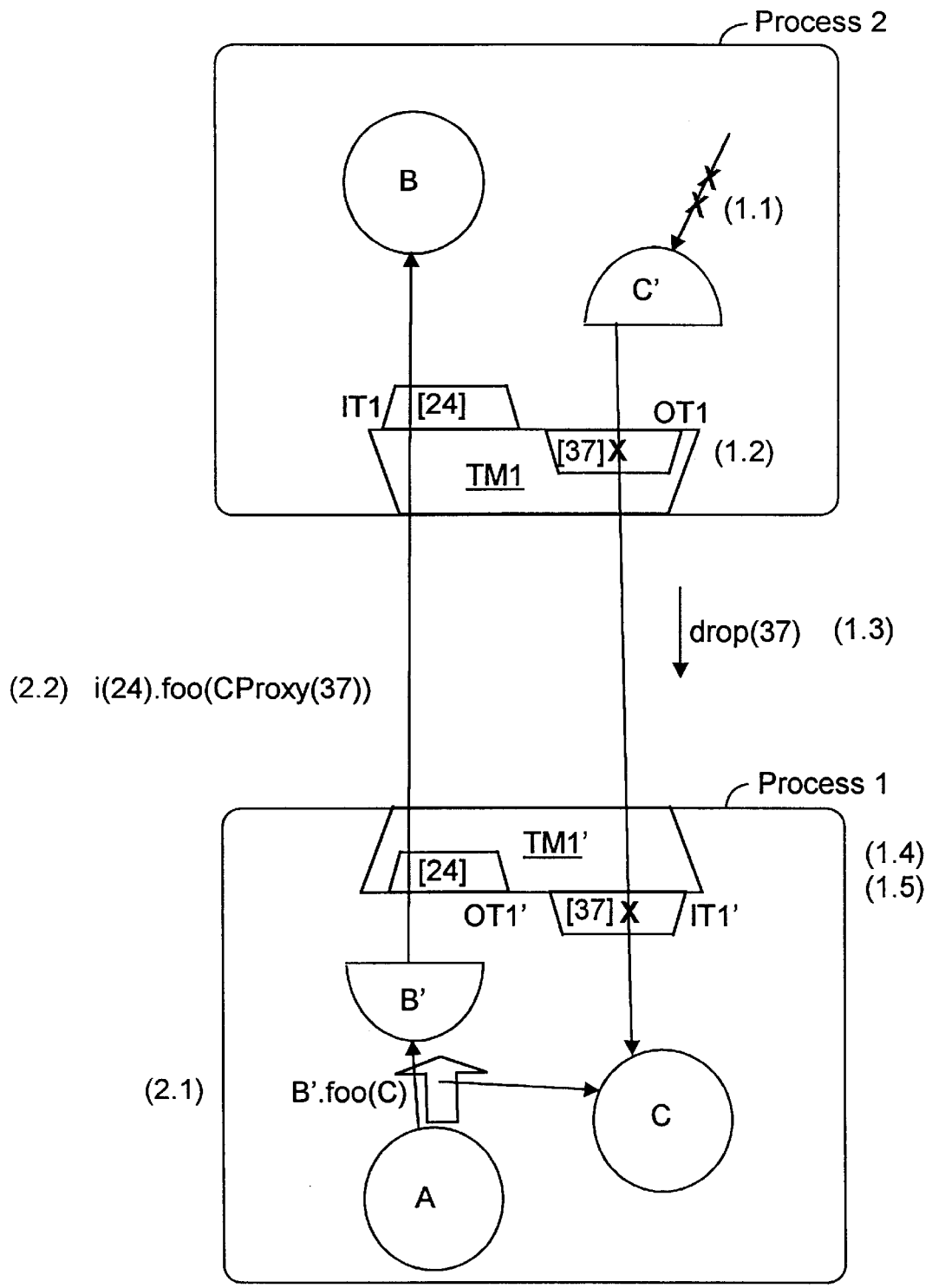
FIG. 9D is a depiction of a garbage collection problem that can arise in distributed object systems.

Referring to FIG. 9C, there is now shown the final result of this three-process reference-passing situation, where the object B1 has a direct reference to the object C1 via the proxy object C1". Once the pair of transport managers TM3, TM3' are in place, objects in process B (e.g., B1) and in process C (e.g., C1) can communicate securely and transparently using the proxies and encryption provided by the present invention; there is no further need of C1's secret number. Instead, the object B1 can securely and transparently access the object C1 using as its mechanism the slot index 3 provided by the transport managers TM3, TM3'. This allows the objects B1 and C1 to conduct secure conversions without the overhead and possible insecurity of multi-process message forwarding (e.g., where B1 and C1 communicate via A1). This solution also provides immediate path shortening between objects, because, ultimately, any passed object reference results in a direct link, consisting of a pair of transport managers TM, being formed between the processes hosting the referenced object and the object to which the reference was passed.

In summary, it is noted that in accordance with the present invention the language-level messages for passing an object reference for an object C1 from a first object A1 to another object B1 is the same, regardless of whether objects C1 and B1 are in the same or different processes from object A1. When the object receiving such a message is a proxy object, because the intended recipient is in another process, methods associated with the proxy object automatically repackage the message so as to enable the receiving object to access the referenced object. As described in more detail above, the repackaged message enables the receiving transport manager to generate a local proxy object, if needed, and to determine which transport manager and which transport manager slot to use to access the referenced object, including (in the case of three process object reference passing) the information needed to set up a new transport manager to communicate with the process in which the referenced object is located. Thus, the present invention provides transparent object access, while also providing a high degree of security in an efficient manner.

Many distributed object systems, including systems providing transparent inter-process messaging, provide distributed garbage collection systems, wherein independent garbage collectors run in each process. These distributed garbage collectors can create potential problems that impair the reliability of two- and three-party object reference passing. Solutions to these problems that are provided by the present invention are now described.

Garbage Collection

The present invention is compatible with local garbage collectors that perform either ref-count or "full" garbage collection (a term that refers to well-known garbage collection methods such as "stop and copy" and "mark and sweep").

The purpose of a distributed garbage collection system is to provide a number of garbage collectors, each of which periodically visits all objects in its process and reclaims (collects) the memory allocated for objects that are no longer being accessed by any other object in the same or other processes. In the present invention, objects can be accessed through two different kinds of pointers: weak pointers (i.e., pointers that refer to an object and can be followed, but which don't cause storage to be retained—used for the link between an out-table slot and the local proxy associated with that out-table slot) and strong pointers (pointers that establish a chain of storage during garbage collection).

For example, in FIG. 9A, there is a weak pointer @C1' from the slot 3 of the out-table OT2 to the proxy object C1' but there is a strong pointer @C1 between the object A1 and C1'. In the garbage collection system of the present invention, assuming the local garbage collectors perform ref-count (short for "reference-count") garbage collection, all objects that are addressed only by weak pointers or no pointers are automatically collected. Alternatively, assuming the local garbage collectors perform full garbage collection, all objects are collected that are not reachable via a chain of strong pointers from the stack or global variables (which are referred to as "roots"). Since in-table pointers are strong, the objects they point to won't be collected until the remote proxy is collected and the in-table entry is cleared.

Additionally, associated with each out-table slot is an unmarshaling count UC that represents the number of received messages referencing the remote object associated with the out-table slot. A transport TM is configured, upon receiving a message including a reference to a local proxy, to increment the unmarshaling count UC for that proxy. A transport TM is configured, upon all local objects dropping their references to a proxy for which the transport has an out-table entry, to delete the proxy's out-table entry and to issue a forget message to the transport in the process hosting the proxy's sibling. The forget message includes the current unmarshaling count UC and a slot number identifying the in-table slot associated with the particular object.

A transport TM is configured, upon receiving a forget message, to subtract the unmarshaling count UC from the marshaling count MC associated with the slot number designated in the forget message. The transport TM is also configured, upon the marshaling count MC going to zero, to (A) delete the designated in-table IT slot and the strong pointer linking the designated in-table slot to the particular object whose remote references were dropped, and (B) issue a second message to the registrar R notifying the registrar R that the in-table slot was deleted.

Garbage collection is readily implemented in object systems where all of the objects are resident in a single process. However, in the situations where object references are being passed between objects in two (FIG. 8) or even three (FIG. 9A–C) processes, automated garbage collection can cause problems unless the delays that occur in inter-process communications are taken into consideration. For example, consider the following two-party reference-passing situation in light of FIG. 9D, which illustrates the interaction of two simultaneous, independent threads, which perform the following steps:

Thread J 1.1. The one reference to C' is dropped;
1.2. as a result, the C' slot, 37, is deleted from the out-table OT1;
1.3. TM1 sends a drop(37) message, which tells TM1' to delete the corresponding slot 37 from its in-table IT1';
1.4. TM1' receives the drop(37) message; and
1.5. TM1' deletes slot 37.

Thread K 2.1. Object A (in process 1) passes object B (in process 2) a language-level message for the process 1 object C (i.e., "B'.foo(C)");
2.2. This message is issued through the proxy B' by TM1' as the network message "i(24).foo(CProxy(37))" because that slot exists in association with the object C.

Assuming conventional garbage collections running independently in processes 1 and 2, after the last pointer to a proxy is released (as is the case when the references (1.1) to C1' are released), the garbage collector (or the reference counting mechanism) will destroy the proxy. The weak pointer from the out-table (e.g., the out-table in process 2) will therefore collapse, triggering the transport manager to (1) clean up the out-table and (2) send a drop message to its sibling TM (e.g., in process 1, TM1 sends a drop message (1.3) to TM1') that tells the sibling to delete the corresponding slot (e.g., slot 37).

The garbage collection problem that can arise given these two simultaneous threads and independent garbage collection occurs when the drop(37) message and the i(24).foo (CProxy(37)) messages cross in transit. When this occurs, TM1 receives the CProxy message and associates a new object C' with slot 37, which is now available (TM1 having deleted it previously), and passes the object reference for C' to the local object B. At the same time, TM1' has deleted slot 37 from its in-table IT1'; meaning that it considers that slot unallocated.

As a result of this situation, C', when it tries to issue messages to C using slot 37, could end up pointing back to no object or, even worse, to an unintended object subsequently remapped to that slot by TM1'.

Traditional garbage collectors can handle this problem, but does so in a way that is susceptible to attack from misbehaving processes that are a part of the distributed system. The method used by traditional distributed garbage collectors is to tenure/grandfather any object that becomes known to non-local objects, rendering it immune to collection. This means that even if garbage collection is performed while inter-process messages are in-transit, the local objects referenced in those messages are not collected.

The present invention avoids the problems caused by message-passing latency by taking into account two types of object references:

(1) in-process object references (e.g., the reference from A1 to A2); and
(2) references that are "in transit" (meaning references that are moving between processes and/or machines).

The solution of the present invention can be thought of as a distributed ref-count garbage collector coexisting with local full or ref-count garbage collectors.

Figure 10A:
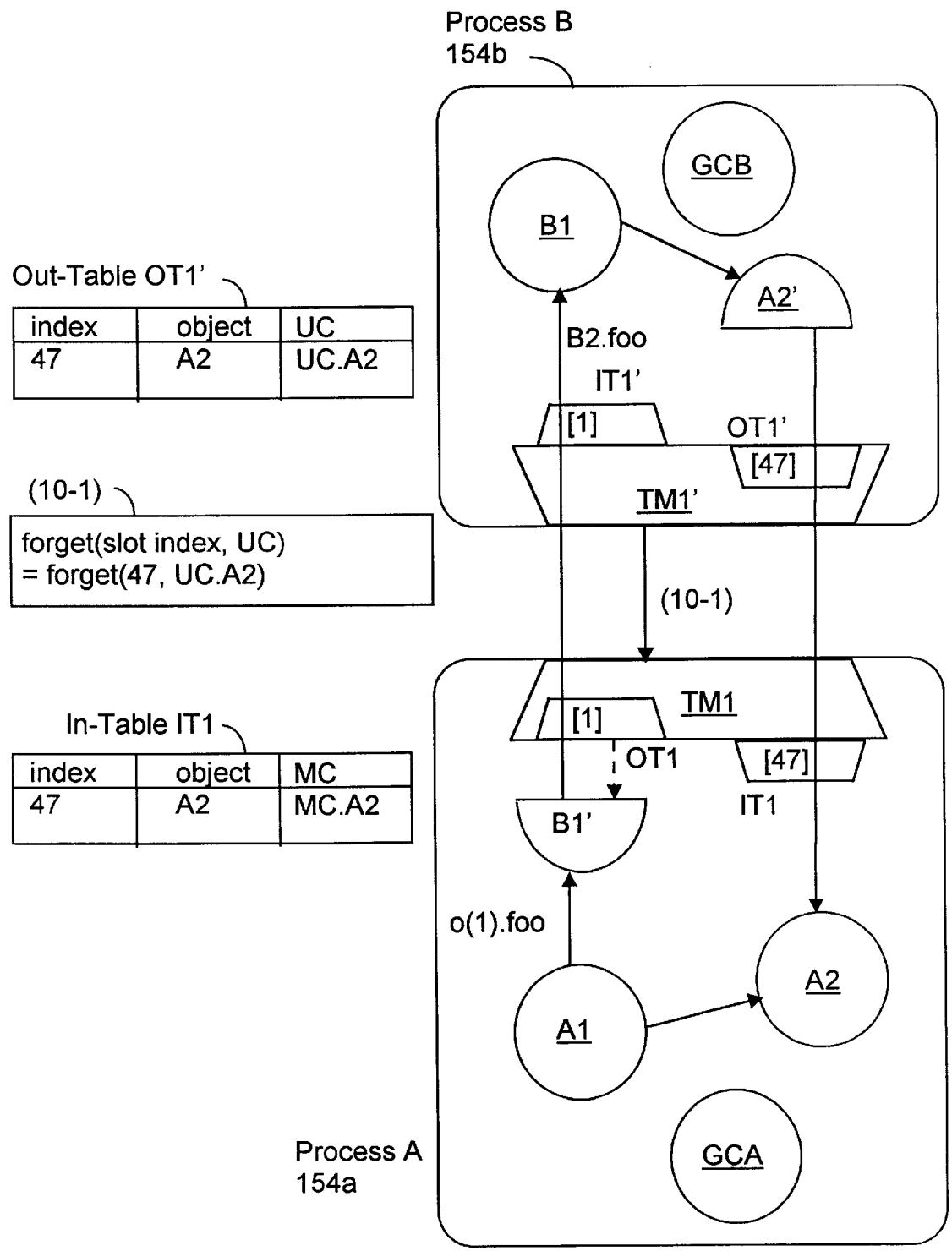
FIG. 10A is a depiction of a preferred embodiment of a garbage collection system that is compatible with transparent, distributed object systems.

The preferred embodiment of the distributed garbage collection system of the present invention is now described in reference to FIG. 10A, where there are shown two processes A, B, a representative in-table IT1 in process A, out-table OT1' in process B and objects A1, A2, A2' (a proxy for object A2), B1 and B1' (a proxy for object B1), and garbage collectors GCA, GCB. The in-table IT1, in addition to the fields already described, includes a marshaling count for each slot. A marshaling count (MC) keeps track of the number of references (actual and in transit) sent to remote objects via a pair of transports for a local object. For example, the marshaling count MC.A2 represents the number of messages sent (marshaled) by TM1 to TM1' that mention A2. So the marshaling count accurately reflects both actual and in transit references, it is incremented every time a message is sent to an object in another process. Moreover, there can be several different marshaling counts for a single object in a given process because an object can have an active in-table slot in multiple transports.

Once all remote references (i.e., references local to a proxy on a remote machine) to a particular object are dropped, the remote process in which the references were dropped deletes the proxy's out-table slot in the appropriate transport manager and sends a "forget" message (10-1) to the process hosting the object whose references were dropped. A forget message (10-1) has two fields:

(1) the slot index corresponding to the object for which the reference is being dropped (slot index), and
(2) an unmarshaling count (uc), which gives the number of messages received (unmarshaled) by the transport manager that mention a local proxy. As shown in FIG. 10A, an unmarshaling count (UC) is stored in the out-table for each active slot. I.e., the unmarshaling count UC.A2 stored in OT1' represents the number of messages received by TM1' that mention A2.

Upon receiving a "forget" message, a process subtracts the unmarshaling count contained in the forget message from the marshaling count in the in-table slot designated in the forget message.

If the marshaling count becomes zero, the process receiving the forget message knows there are no references in transit to the local object and that the in-table slot designated in the message can safely be re-used. When this is the case the TM deletes the in-table pointer to the referenced object and marks that slot for re-use. Of course, if the only reference to the local object were the in-table pointer, deleting this pointer would result in the local garbage collector collecting the object. If the marshaling count becomes negative, an error is detected.

This mechanism allows the transport manager TM to continue to handle incoming references as it did earlier. When it receives a reference to an object residing at the source of the message, the TM1 looks at the indicated out-table index. If a proxy is there, it must be the right one. If the slot is empty, the TM can create a new proxy from the information in the message.

In other words, unless the sum of all of the marshaling counts and local references for an object is zero, the garbage collector (GC) of the preferred embodiment will not collect the object or reuse its index. This avoids the problems outlined above, where objects are collected and in-table slots are reused while a reference is in transit. This is not possible in the preferred embodiment described herein because the marshaling count cannot go to zero unless all remote and in-transit references have already been received and accounted for in an unmarshaling count maintained by a remote proxy. Note that a marshaling count is not a ref-count.

Figure 10B:
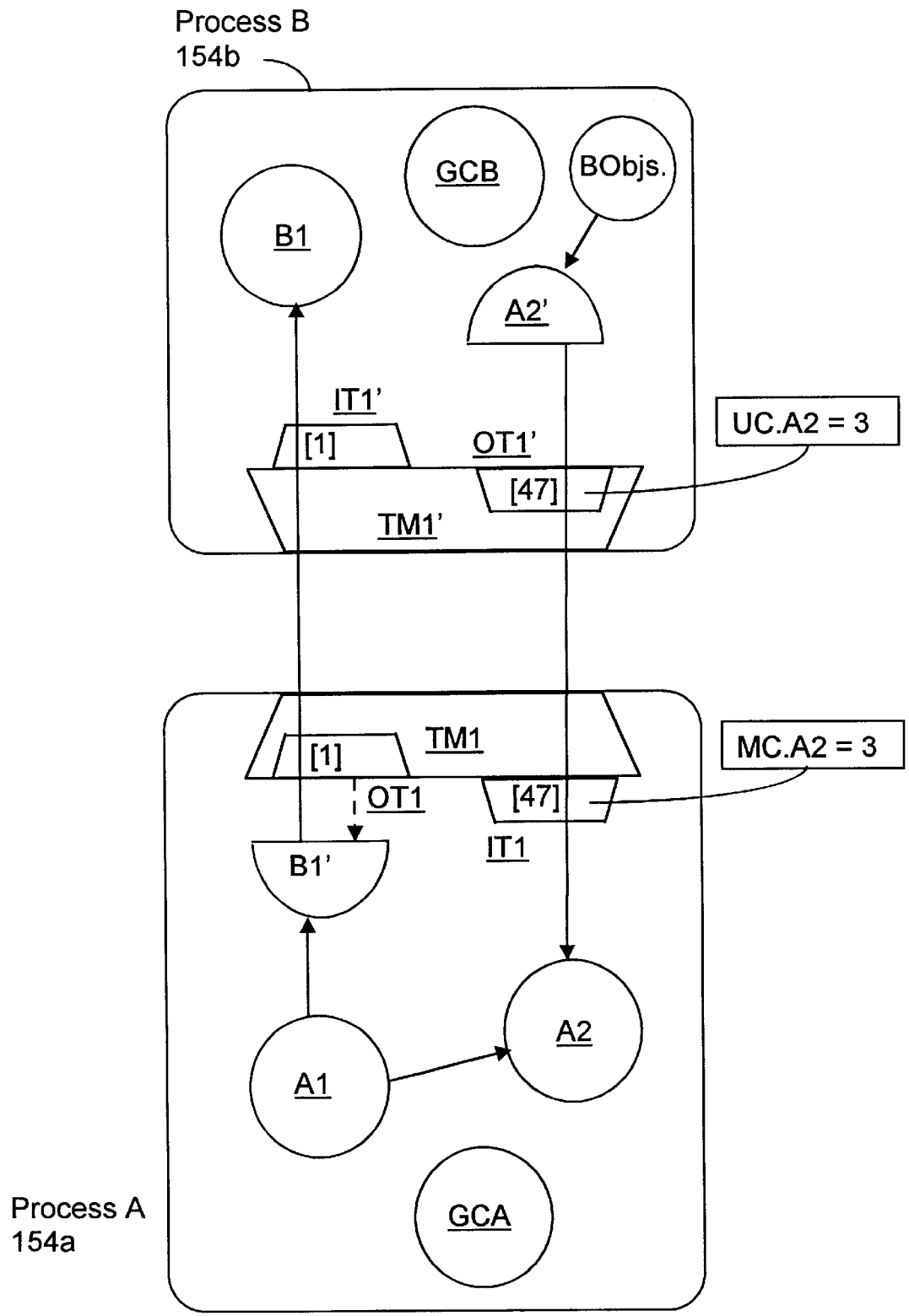
FIG. 10B depicts the status of the garbage collector of FIG. 10 prior to A1 sending an object reference for A2 to B2.
Figure 10C:
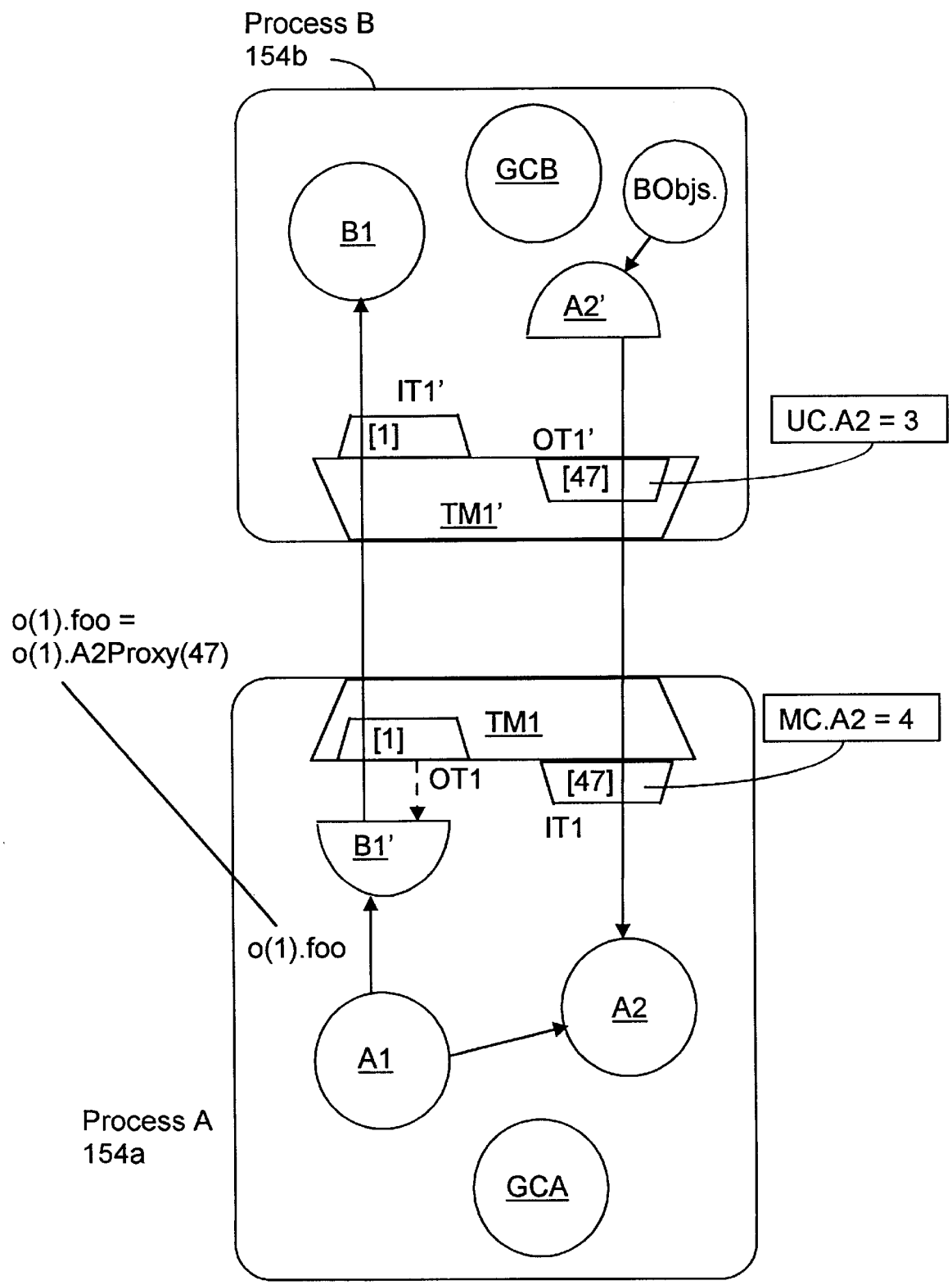
FIG. 10C depicts the status of the garbage collector of FIG. 10 after A1 sends the object reference for A2 to B2 but before that reference is received by B2.
Figure 10D:
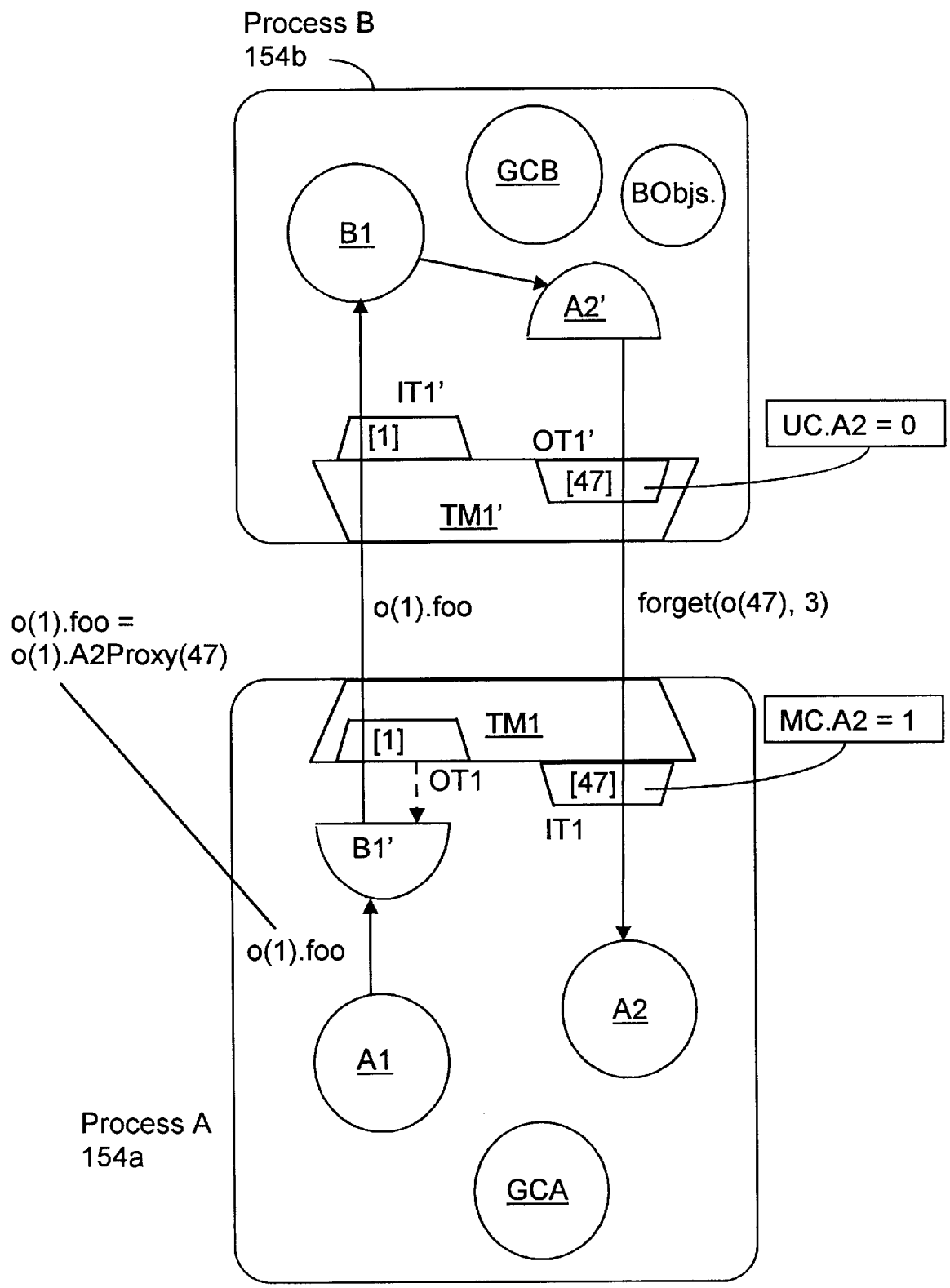
FIG. 10D depicts the status of the garbage collector of FIG. 10 after a number of process B objects delete their references to A2.

For example, referring to FIG. 10B, the object A2, which is associated with slot 47 in the in-table IT1, initially has a marshaling count (MC.A2) of 3 and the proxy object A2' has an unmarshaling count (UC.A2) of 3. This indicates that all three A2 references issued by process A objects have been received by process B. Next, referring to FIG. 10C, the object A1 passes an A2 reference message 10-1 to object B1, after which A1 increments the marshaling count in the slot 47 of the in-table IT1. Now, the marshaling count MC.A2 in slot 47 is 4, while the unmarshaling count UC.A2 maintained by the proxy object A2' is 3. At this point, referring to FIG. 10D, the object A1drops its pointer to A2, and the process B objects (BObjs.) drop all references to A2' and, as a result, process B sends the forget message ("forget(47, 3)") to TM1. At this point, because the MC for A2 is non-zero, the GCA does not collect A2. A conventional garbage collector which did not track the number of references sent to and received by remote processes would have collected A2 at this point because it would not have considered the reference to A2 in transit.

In the preferred embodiment, the marshaling and unmarshaling counts are prevented from overflowing their storage, which could occur when one more reference is sent or received than can be represented in the number of bits allocated to store the counts. This is accomplished by a transport manager with a non-zero unmarshaling count shipping a forget message to its corresponding remote transport manager that contains an unmarshaling count that is less than the current marshaling count. These messages can be sent periodically or when the unmarshaling count exceeds some present threshold. For example, assuming UC=2,000,000,004 and MC=2,000,000,008, a forget message with an unmarshaling count of 2,000,000 could be sent. After the message is sent and processed, UC=4 and MC=8, leaving much more room for additional marshalings and unmarshalings to be represented. As a result, the marshaling count never goes to zero until the last remote reference is gone. This adjustment reflects the fact that the marshaling count is not a ref-count.

Other preferred embodiment can make a variety of decisions about when to decrement the unmarshaling count and send a forget message indicating the amount decremented.

To handle the three process case, another feature is provided by the garbage collection system of the present invention. This additional feature prevents the garbage collection problem wherein the in-table reference to the object to which a third-party reference is being passed (e.g., C1 in FIG. 9A) is deleted before the object receiving the reference (B1) can set up a pair of transports and an active index and marshaling count for the referenced object (C1). When this occurs, the reference to C1 is lost to the processes A and B completely and there is no way to regain it. This problem can arise when the object sending the reference (e.g., A1) drops its proxy (C1') to the referenced object just after issuing the third-party message. When this occurs, as described above for the two process problem, A1 sends a forget(47, 1) message to process C for the in-table slot corresponding to object C1 (which has MC=1) and, because C1 does not know about the reference in transit to B1, process C will prematurely decrement C1's MC to zero and delete C1's IT index for reuse. The solution to this problem provided by the present invention is now described in reference to FIG. 11.

Figure 11:
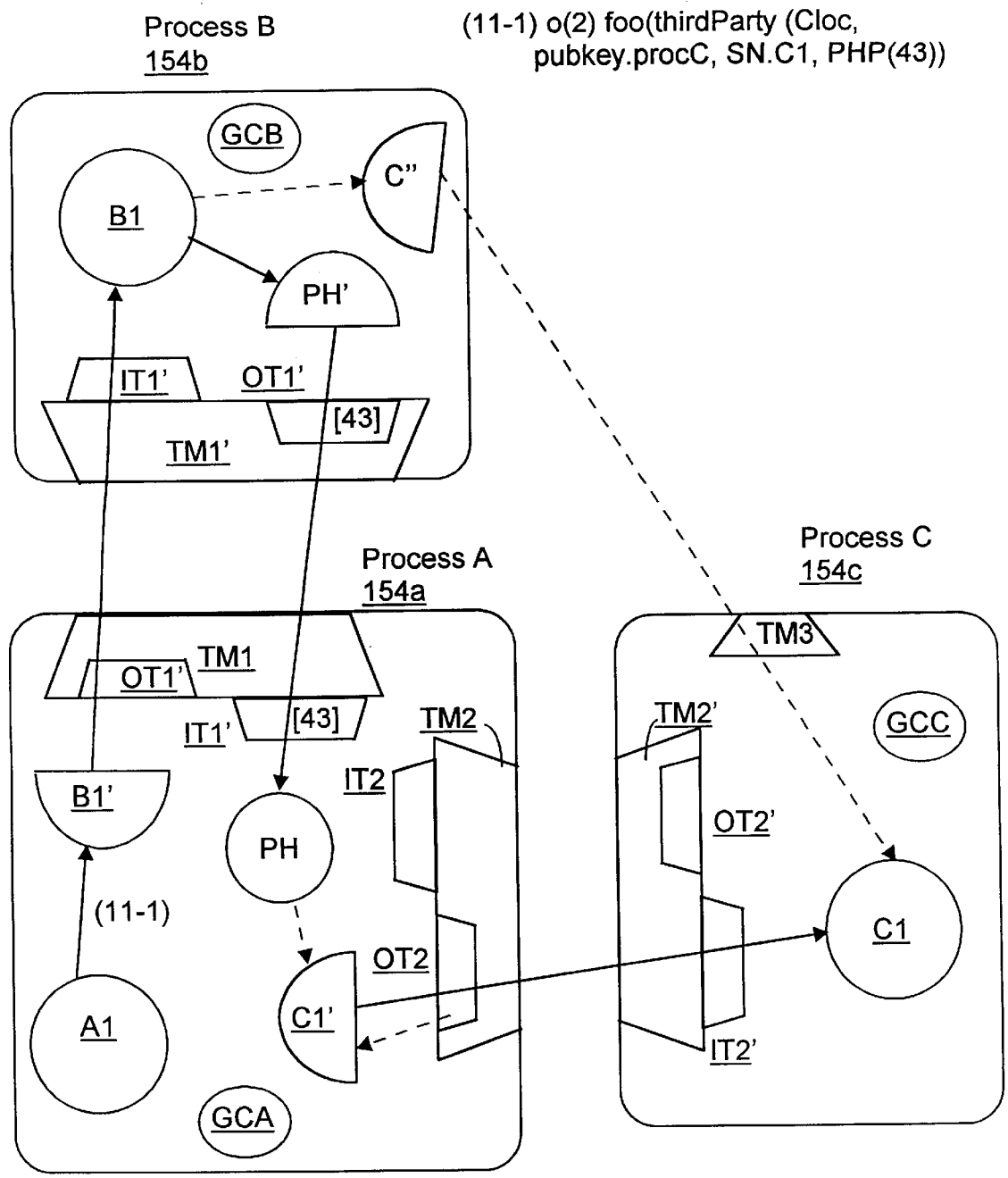
FIG. 11 is a depiction of a preferred embodiment of a garbage collection system that is compatible with transparent, distributed object systems that support three-party object-reference passing.

Referring to FIG. 11, anytime a third party message (e.g., 11-1) is sent, the sending object (e.g., A1) creates a proxy holder (PH) whose sole purpose is to maintain a reference to the referenced object's proxy (e.g., C1'). As a result, even though the sending object might immediately drop its own reference to the proxy object (C1') after sending the message, neither the proxy object (C1') nor the in-table slot (slot 47 in IT2') are collected. The proxy holder PH allows the receiver object (e.g., B1) to access the referenced object (e.g., C1) through the existing proxy object (C1') if the receiver object is unable to establish a direct connection to the referenced object (e.g., C1) via a new pair of transport managers (not shown) and proxy (C1"). Of course, as with all other inter-process communications in the present invention, the receiver object can only communicate with the proxy holder PH via a proxy object (a proxy holder proxy PH') in its own process. Consequently, every third-Party message (11-1) also includes a proxyHolder field (mentioned above in reference to FIGS. 9A–9C) that identifies the slot index (e.g., 43) in the relevant pair of transports to be used for communications by the proxy holder PH and the proxy holder proxy PH'.

Once the receiver (B1) establishes a direct connection with the referenced object (C1), the receiver (B1) simply drops its reference to PH', which eventually results in the garbage collector running in process B (GCB) collecting PH' (because PH' has no more local references) and the garbage collector in process A (GCA) collecting PH (through the process of marshaling and unmarshaling counts, described above). Once PH is collected, there is no longer a reference to C1' in process A, so GCA collects C1', which leads to GCC safely deleting (based again on marshaling and unmarshaling counts) the index in its in-table IT2' that allowed objects in process A to access the object C1. C1 does not get garbage collected because it is still held by TM3.

The present invention also provides one additional safeguard that enables garbage collection to be performed in the distributed object environment of the present invention. This feature has to do with the fact that each secret number table entry 352-$i$ maintained by a registrar 350 includes a strong pointer to its associated object. Thus, if this strong pointer is never deleted, the associated object will never be deleted by its co-located garbage collector, even if the sum of all marshaling counts and local ref-counts for that object are zero. Consequently, the garbage collector of the preferred embodiment provides a mechanism whereby a registrar 350 keeps track of the number of in-table references for objects it has registered and deletes its strong pointer when a registered object is no longer referenced in any in-table IT. Two different embodiments of this mechanism are now described in reference to FIGS. 12A and 12B, respectively.

Figure 12A:
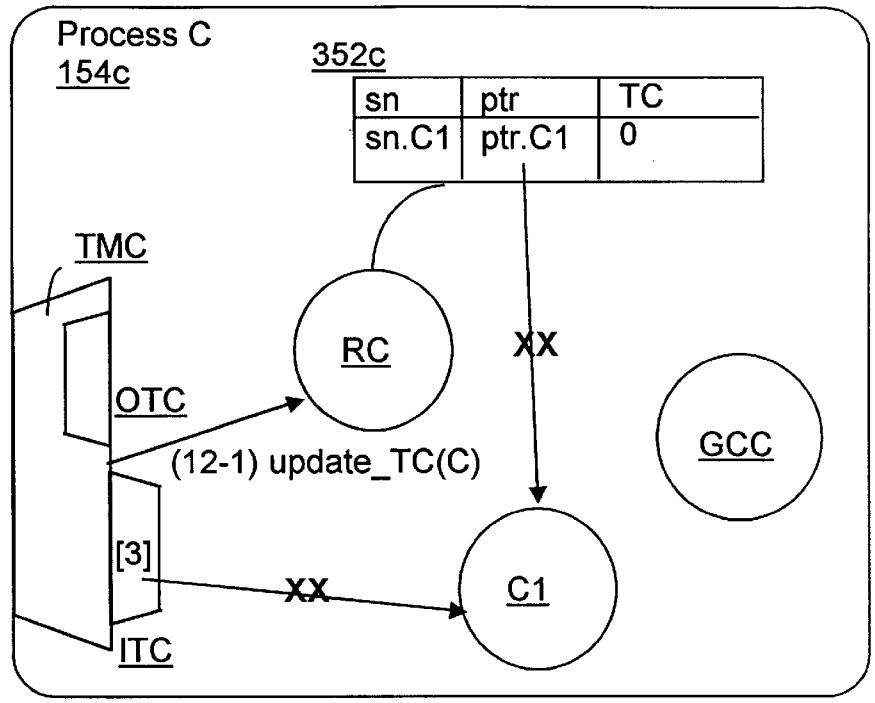
FIG. 12A shows a first embodiment of a system by which the garbage collection system of FIG. 11 deletes object pointers from the local registrar.

FIG. 12A shows process C and an object C1 with an associated slot in the in-table ITC and an entry in the secret number table maintained by the registrar RC. Each entry of the secret number table 352c includes a strong pointer to the one object, the unguessable secret number (SN) for that object, and a transport counter (TC), which is a number that equals the number of in-tables entries for a particular object. The registrar RC increments an object's transport counter every time a local object is newly entered into an in-table. Then, every time an in-table entry is deleted, the transport in which the deletion occurred sends an update_TC message 12-1 (e.g., "update_TC(C)") to the registrar RC, which tells the registrar to deduct 1 from the TC for a particular object. When the TC hits 0 for a registered object, the registrar RC deletes its strong pointer to that object and the object is collected (unless it is referenced by some local object).

Figure 12B:
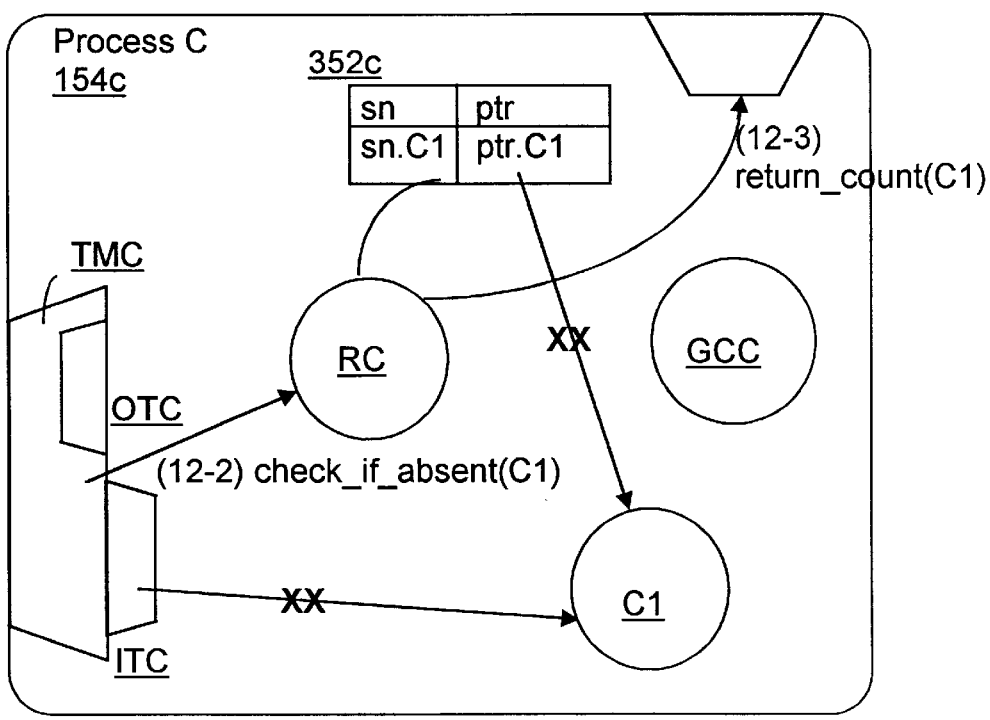
FIG. 12B shows a second embodiment of a system by which the garbage collection system of FIG. 11 deletes object pointers from the local registrar.

The other embodiment is shown in FIG. 12B. This embodiment includes the same basic elements as shown in FIG. 12A, except the secret number table does not include a transport counter for each entry. Here, whenever an in-table object reference is deleted due to the execution of a "forget" message, the respective transport manager (e.g., TMC) issues a check_if_absent message 12-2 (e.g., "check_if_absent(C1)") to the registrar RC, which then checks to see whether it can delete the entry in the secret number table that corresponds to the object whose in-table reference was deleted. It does this by polling all transports in its process using a return_count message 12-3 (e.g., "return_count(C1)"), which asks the transports TM in process C (other than TMC) whether they still have an in-table reference to the designated object (e.g, object C1). If none of the transports have such an in-table reference, the registrar deletes the secret number and its strong pointer to the object.

An advantage of these methods of present invention is that they operate under attack (where one misbehaving process tries to convince another process that it has accounted for all marshaling counts). This is because a misbehaving process can't zero out marshaling counts of objects in transports other than its own. As a result, a registrar won't delete its strong pointer to an object solely by virtue of the misbehaving pointer zeroing out all of its marshaling counts. In such a case, all the misbehaving object will have accomplished is deleting its own reference to that particular object. Such operation under attack is provided by the cryptographic features of the present invention and is not possible in present distributed garbage collection systems, which do not provide capability security.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, while the description of the preferred embodiments that provide capability security for transparent distributed object systems focus on systems where the transparency is provided by object proxies and transport managers at the process level, the disclosed techniques would be equally appropriate to other implementations of transparent systems. For example, one could apply the disclosed techniques to a system in which objects communicate transparently with one another directly; i.e., without a process-level transport manager.

What is claimed is:

1. A garbage collection system for use in a distributed object system wherein communications between objects in different processes are rendered transparent through the use of proxy objects and transports, a proxy object resident in a first process being a local representative of a corresponding remote object resident in a second, different process, said transports existing in pairs, a first transport of a pair of transports residing in said first process and including a first in-table and a first out-table matched, respectively, to a second out-table and a second in-table in a second transport of said pair of transports resident in said second process, said pair of transports enabling communication between said proxy object and said corresponding remote object by providing corresponding in-table slots in said first and second in-tables and corresponding out-table slots in said first and second out-tables, each in-table slot including a strong pointer to its associated local object, said garbage collection system comprising:

an encryptor associated with each said transport;

a decryptor associated with each said transport; said encryptor and decryptor being used in tandem by a pair of transports to respectively encrypt and decrypt messages including an object reference transmitted between said pair and thereby maintain capability security within said distributed object system;

a local garbage collector in each of a subset of said processes;

a registrar object in each of said subset of processes;

a secret number table maintained by said registrar for a subset of the local objects in its process, each entry in said secret number table including:
 a practically unguessable secret code associated solely with one of said subset of local objects, and
 a strong pointer to said one object;

a marshaling count associated with each in-table slot;

said transport being configured, upon relaying a message referencing a particular object to a remote object in a remote process, to increment a marshaling count for said particular object;

said transport being configured, upon receiving a forget message from a remote transport, said forget message including an unmarshaling count indicating the number of received messages including references to a proxy object in said remote process linked to said particular object, to subtract an amount equal to said unmarshaling count from said marshaling count for said particular object;

said transport being configured, upon said marshaling count going to zero for said particular object, to:
 delete said in-table slot and the strong pointer linking said in-table slot to said particular object, and
 issue a second message to said registrar notifying said registrar that said in-table slot was deleted;

said registrar being configured, upon receiving said second message, to determine whether there are pointers to said particular object in said in-table slots provided by other transports in its process, and, when there are no such in-table slots, to delete said strong pointer to said particular object and null out said secret code associated with said particular object.

2. The garbage collection system of claim 1, further comprising:

an unmarshaling count associated with each proxy object;

said transport being configured, upon receiving a message referencing a particular object in a remote process, to increment said unmarshaling count associated with a particular proxy linked to said particular object; and said particular proxy being configured, upon all objects in said local process dropping their references to said particular proxy, to issue a forget message to said transport in said process hosting said particular proxy, said forget message including:

an unmarshaling count indicating the number of dropped references, and a slot number identifying an in-table slot associated with said particular object and proxy.

3. The garbage collection system of claim 2, wherein:

each said secret number table entry includes a transport counter indicating a number of in-table entries associated with said one object associated with said entry; and said second message comprises an update transport counter message that tells said registrar to update its secret number table entry for the particular object whose in-table entry was previously deleted by said transport manager;

said update message also being issued to said registrar upon the allocation of a new in-table slot for said particular object;

said registrar being configured, upon receiving said update transport counter message, to update said transport counter for said particular object; and said registrar determining whether there are pointers to said particular object in said in-table slots by comparing the updated transport counter to a predetermined deletion value.

4. The system of claim 3, wherein said update comprises:

decrementing said transport counter when said in-table slot is deleted and incrementing said transport counter when said in-table slot is allocated; and said predetermined deletion value is zero.

5. The garbage collection system of claim 2, wherein:

said second message comprises a check if absent message that tells said registrar to query other transports in said same process as to whether they have entries for said particular object in their respective first or second in-tables;

said registrar being configured, upon receiving said check if absent message, to issue respective return count messages to said other transports asking said other transports to return a respective in table count message indicating whether their respective first or second in-table includes a slot for said particular object; and said registrar being configured, upon receiving said transports' responses, to determine whether any of said transports include a first or second in-table entry for said particular object.

6. The system of claim 2, wherein said message including an object reference comprises a third party message, said system further comprising:

a proxy holder object resident in said first process with a strong reference to a local proxy linked to said particular object, said particular object being resident in a third process; and a proxy holder proxy resident in said second process linked with said proxy holder object across a pair of said transports via a designated index, said proxy holder proxy being referenced by the receiving object that is the destination of said third party message;

said receiving object being configured to not drop its reference to said proxy holder proxy until said receiving object is in possession of a direct reference to said particular object resulting from execution of said third-party message, thereby preventing a local garbage collector in said first process from collecting said proxy object linked to said particular object until said direct reference is available.

7. The system of claim 2, wherein said local garbage collectors perform a type of garbage collection selected from the set including ref-count garbage collection (GC), full GC, linearity GC, conservative GC, incremental GC, concurrent GC, treadmill GC, compacting GC and scavenging GC.

8. The system of claim 1, wherein said secret code is a secret number.

9. A garbage collection method for use in a distributed object system wherein communications between objects in different processes are rendered transparent through the use of proxy objects and transports, a proxy object resident in a first process being a local representative of a corresponding remote object resident in a second, different process, said transports existing in pairs, a first transport of a pair of transports residing in said first process and including a first in-table and a first out-table matched, respectively, to a second out-table and a second in-table in a second transport of said pair of transports resident in said second process, said pair of transports enabling communication between said proxy object and said corresponding remote object by providing corresponding in-table slots in said first and second in-tables and corresponding out-table slots in said first and second out-tables, each in-table slot including a strong pointer to its associated local object, said garbage collection method comprising the steps of:

encrypting and decrypting messages including an object reference transmitted between a pair of transports, thereby maintaining capability security within said distributed object system;

performing local garbage collection in each process;

providing a unique, practically unguessable secret code for each of a subset of objects in said each process;

providing a registrar object in said each process that is responsive to messages designating said subset of objects by said secret codes and that maintains a strong pointer to each of said subset of objects through which said registrar accesses each of said subset of objects in response to said messages;

upon the issuance of a message referencing a particular object in said first process to a remote object in said second process, incrementing a marshaling count for said particular object;

upon the receipt of a forget message from a remote transport, said forget message including a drop number indicating the number of dropped references to a proxy object in said remote process linked to said particular object, subtracting an amount equal to said drop number from said marshaling count for said particular object;

upon said marshaling count going to zero:

deleting said in-table slot and deleting said strong pointer linking said in-table slot to said particular object, and issuing a second message to said registrar notifying said registrar that said in-table slot was deleted;

said registrar, upon receiving said second message, determining whether there are pointers to said particular object in in-table slots provided by other transports in its process, and, when there are no such in-table slots, deleting said strong pointer to said particular object and nulling out said secret code associated with said particular object.

10. The garbage collection method of claim 9, further comprising the steps of:

upon receiving a message referencing a particular object resident in a remote process, incrementing an unmarshaling count associated with a particular proxy resident in said local process that is linked to said particular object via a pair of local and remote transports; and upon all said references to said particular proxy being dropped, issuing a forget message to said remote transport designating said unmarshaling count; and upon receiving a subsequent message with a reference to said particular proxy:
when said particular proxy has been previously garbage collected, recreating said particular proxy and associating said recreated proxy with said first out-table slot; and
when said particular proxy has not been garbage collected, re-associating said particular proxy with said first out-table slot;

such that messages that were in transit to said transport sending said forget message can subsequently be delivered.

11. The garbage collection method of claim 10, wherein said step of issuing said second message and said determining step comprise:
issuing an update transport counter message to said registrar designating said particular object;
said registrar, upon receiving said update transport counter message:
updating a transport counter for said particular object; and
determining whether there are pointers to said particular object in said in-table slots by comparing the updated transport counter to a predetermined deletion value;
said update counter message also being issued when a new in-table slot is allocated to said particular object.

12. The method of claim 11, wherein:
said updating step comprises: decrementing said transport counter when said in-table slot is deleted and incrementing said transport counter when said in-table slot is allocated; and
said predetermined deletion value is zero.

13. The method of claim 10, wherein said step of issuing said second message and said determining step comprise:
issuing a check if absent message to said registrar designating said particular proxy;
said registrar, upon receiving said check if absent message, issuing return count messages to said other transports designating said particular proxy;
each of said other transports, upon receiving said return count message, returning a count message indicating whether their respective first or second in-table includes a slot for said particular proxy; and
said registrar, upon receiving said count messages, determining whether any of said other transports have an in-table slot for said particular proxy.

14. The method of claim 10, wherein said message comprises a third party message passing said remote object in said second process a reference to said particular object, said particular object being resident in a third process, further comprising the steps of:
upon receiving said third-party message, said first transport creating a proxy holder object resident in said first process with a strong reference to a local proxy linked to said particular object and issuing a network third-party message designating an in-table slot index in said first transport associated with said proxy-holder object; and upon receiving said network third-party message, said second transport:
creating a proxy holder proxy resident in said second process linked with said proxy holder object across said first and second transports via said designated index;
passing a reference to said proxy holder proxy to said remote object; and
re-issuing said network proxy message to said third process;
said receiving object dropping its reference to said proxy holder proxy only upon gaining possession of a direct reference to said particular object resulting from execution of said re-issued third-party message by said third process, thereby preventing said local garbage collection step performed in said first process from collecting said proxy object linked to said particular object until said direct reference is available.

15. The method of claim 10, wherein said step of performing local garbage collection comprises performing refcount garbage collection.

16. The method of claim 10, wherein said step of performing local garbage collection comprises performing a type of garbage collection selected from the set including ref-count collection (GC), full GC, linearity GC, conservative GC, incremental GC, concurrent GC, treadmill GC, compacting GC and scavenging GC.

17. A garbage collection system for use in a distributed object system wherein communications between objects in different processes are rendered transparent through the use of proxy objects and transports, a proxy object resident in a first process being a local representative of a corresponding remote object resident in a second, different process, said transports existing in pairs, a first transport of a pair of transports residing in said first process and including a first in-table and a first out-table matched, respectively, to a second out-table and a second in-table in a second transport of said pair of transports resident in said second process, said pair of transports enabling communication between said proxy object and said corresponding remote object by providing corresponding in-table slots in said first and second in-tables and corresponding out-table slots in said first and second out-tables, each in-table slot including a strong pointer to its associated local object, said garbage collection system comprising:
an encryptor associated with each said transport;
a decryptor associated with each said transport; said encryptor and decryptor being used in tandem by a pair of transports to respectively encrypt and decrypt messages including an object reference transmitted between said pair and thereby maintain capability security within said distributed object system;
a local garbage collector in each of a subset of said processes;
a registrar object in each of said subset of processes;
a secret number table maintained by said registrar for a subset of the local objects in its process, each entry in said secret number table including:
a practically unguessable secret code associated solely with one of said subset of local objects, and
a strong pointer to said one object;
an unmarshaling count associated with each proxy object;
said transports being configured, upon receiving a message referencing a particular object in a remote process, to increment said unmarshaling count associated with a particular proxy linked to said particular object; and said particular proxy being configured, upon all objects in said local process dropping their references to said particular proxy, to issue a forget message to said transport in said process hosting said particular proxy, said forget message including:
an unmarshaling count indicating the number of dropped references, and
a slot number identifying said in-table slot associated with said particular object and proxy.

18. A garbage collection system for use in a distributed object system wherein communication between objects in different processes is rendered through inter-process messages, some of said messages including object references, said garbage collection system comprising:
an encryptor associated with said processes;
a decryptor associated with said processes; said encryptor and decryptor being used in tandem by a pair of said processes to respectively encrypt and decrypt messages transmitted between said pair and thereby maintain capability security within said distributed object system;
a marshaling count representing the number of said messages transmitted from one to another of said process pair that include a remote reference to an object co-located with said marshaling count; and
a local garbage collector in each of a subset of said processes, said local garbage collector collecting memory allocated to un-referenced objects, said un-referenced objects not including local objects whose sole references are said remote references;
said encryptor and decryptor ensuring that a misbehaving process participating in said distributed object system will not substantially disrupt said local garbage collectors in a manner selected from a set of manners including:
(1) causing said local garbage collectors to collect referenced objects; and
(2) causing said local garbage collectors to refrain from collecting said un-referenced objects.

19. The garbage collection system of claim 18, further comprising:
a registrar object in each of said subset of processes;
a secret number table maintained by said registrar for local objects in its process, each entry in said secret number table being associated with one of said local objects and including:
a practically unguessable secret code associated solely with said one object, and
a strong pointer to said one object;
a marshaling count associated with each in-table slot;
a first transport being configured, upon relaying a message referencing a particular object to a remote object, to increment said marshaling count for said particular object and, upon relaying a first message referencing said particular object, to increment said marshaling count, thereby representing the presence of a particular proxy corresponding to said particular object as one count of said marshaling count;
a second transport being configured, upon receiving a message referencing said particular object, to return a drop message indicating said message was received;
said second transport being configured, upon all local references to said particular proxy being dropped, to make available a first out-table slot associated with said particular proxy; said transport being configured to subsequently send a drop message designating said particular object when said particular proxy is garbage collected;
said first transport being configured, upon receiving said drop message, to subtract one from said marshaling count associated with said slot index;
said first transport being configured, upon said marshaling count going to zero, to:
delete said first in-table slot and delete a strong pointer linking said first in-table slot to said particular object, and
issue a second message to said registrar notifying said registrar that said first in-table slot was deleted;
said registrar being configured, upon receiving said second message, to determine whether there are pointers to said particular object in in-table slots provided by other transports in its process, and, when there are no such in-table slots, to delete said strong pointer to said particular object and null out said secret code associated with said particular object; and
said second transport being configured, upon receiving a subsequent message with a reference to said particular proxy, to:
when said particular proxy has been previously garbage collected, to recreate said particular proxy and to associate said recreated proxy with said first out-table slot; and
when said particular proxy has not been garbage collected, to re-associate said particular proxy with said first out-table slot;
such that messages that were in transit to said second transport can subsequently be delivered.

20. A garbage collection method for use in a distributed object system wherein communication between objects in different processes is rendered through inter-process messages, some of said messages including object references, said garbage collection method comprising the steps of:
encrypting said inter-process messages upon transmission;
decrypting said encrypted inter-process messages upon reception; said encrypting and decrypting steps being employed to maintain capability security within said distributed object system;
representing within a process the presence of remote references to local objects;
locally collecting memory allocated to un-referenced objects, said un-referenced objects not including said local objects whose sole references are said remote references;
such that a misbehaving process participating in said distributed object system is highly unlikely to disrupt said memory collecting step in a manner selected from a set of manners including:
(1) causing said local garbage collectors to collect referenced objects; and
(2) causing said local garbage collectors to refrain from collecting said un-referenced objects.

* * * * *